US009497615B2

(12) United States Patent
Anslot et al.

(10) Patent No.: US 9,497,615 B2
(45) Date of Patent: Nov. 15, 2016

(54) METHOD AND SYSTEM FOR PROVIDING COMMUNICATION SERVICES TO A ROAMING WIRELESS DEVICE

(71) Applicant: BUZZINBEES, Seyssinet Pariset (FR)

(72) Inventors: Michel Anslot, Mougins (FR); Philippe Bouckaert, Biot (FR); Gilles Coppe, Valbonne (FR)

(73) Assignee: Buzzinbees, Seyssinet Pariset (FR)

( * ) Notice: Subject to any disclaimer, the term of this patent is extended or adjusted under 35 U.S.C. 154(b) by 0 days.

(21) Appl. No.: 14/380,668

(22) PCT Filed: Feb. 21, 2013

(86) PCT No.: PCT/EP2013/053407
§ 371 (c)(1),
(2) Date: Aug. 22, 2014

(87) PCT Pub. No.: WO2013/124334
PCT Pub. Date: Aug. 29, 2013

(65) Prior Publication Data
US 2015/0304836 A1  Oct. 22, 2015

(30) Foreign Application Priority Data

Feb. 24, 2012 (EP) .................................... 12157011

(51) Int. Cl.
H04W 8/06 (2009.01)
H04W 4/14 (2009.01)
H04W 4/00 (2009.01)
H04W 88/14 (2009.01)
H04W 12/06 (2009.01)
(Continued)

(52) U.S. Cl.
CPC ............... H04W 8/06 (2013.01); H04W 4/005 (2013.01); H04W 4/14 (2013.01); H04W 12/06 (2013.01); H04W 88/14 (2013.01); H04L 61/20 (2013.01);
(Continued)

(58) Field of Classification Search
CPC ..... H04W 8/22; H04W 8/183; H04W 48/18; H04W 8/12; H04W 8/06; H04W 8/26
USPC ................... 455/418, 432.1, 433, 435.1, 445
See application file for complete search history.

(56) References Cited

U.S. PATENT DOCUMENTS

2003/0129991 A1  7/2003 Allison et al.
2007/0293216 A1  12/2007 Jiang
(Continued)

FOREIGN PATENT DOCUMENTS

EP  1296529  3/2003

OTHER PUBLICATIONS

International Search Report and Written Opinion for PCT/EP2013/053407 dated Jul. 24, 2013, Applicant, Buzzinbees, (13 pages).
ETSI, Digital cellular telecommunications system (Phase 2+) (GSM); Universal Mobile Telecommunications System (UMTS); Technical Report on the Gateway Location Register; (3GPP TR23.909 version 4.0.0 Release 4; vol. 3; Mar. 1, 2001 (62 pages).

Primary Examiner — Kamran Afshar
Assistant Examiner — Ather Mohiuddin
(74) Attorney, Agent, or Firm — McCracken & Gillen LLC

(57) ABSTRACT

Method and system for optimizing the roaming mechanism through handling by the visited network the data that are sent by the wireless devices without routing these data to the home network. International gateways are therefore not used or are used for much fewer communications, thereby decreasing the cost of roaming for telecommunication operators. In addition, the invention allows processing in the home network the authentication and charging operation that needs sensitive information, preserving thereby the security of data.

14 Claims, 11 Drawing Sheets

Figure 1:
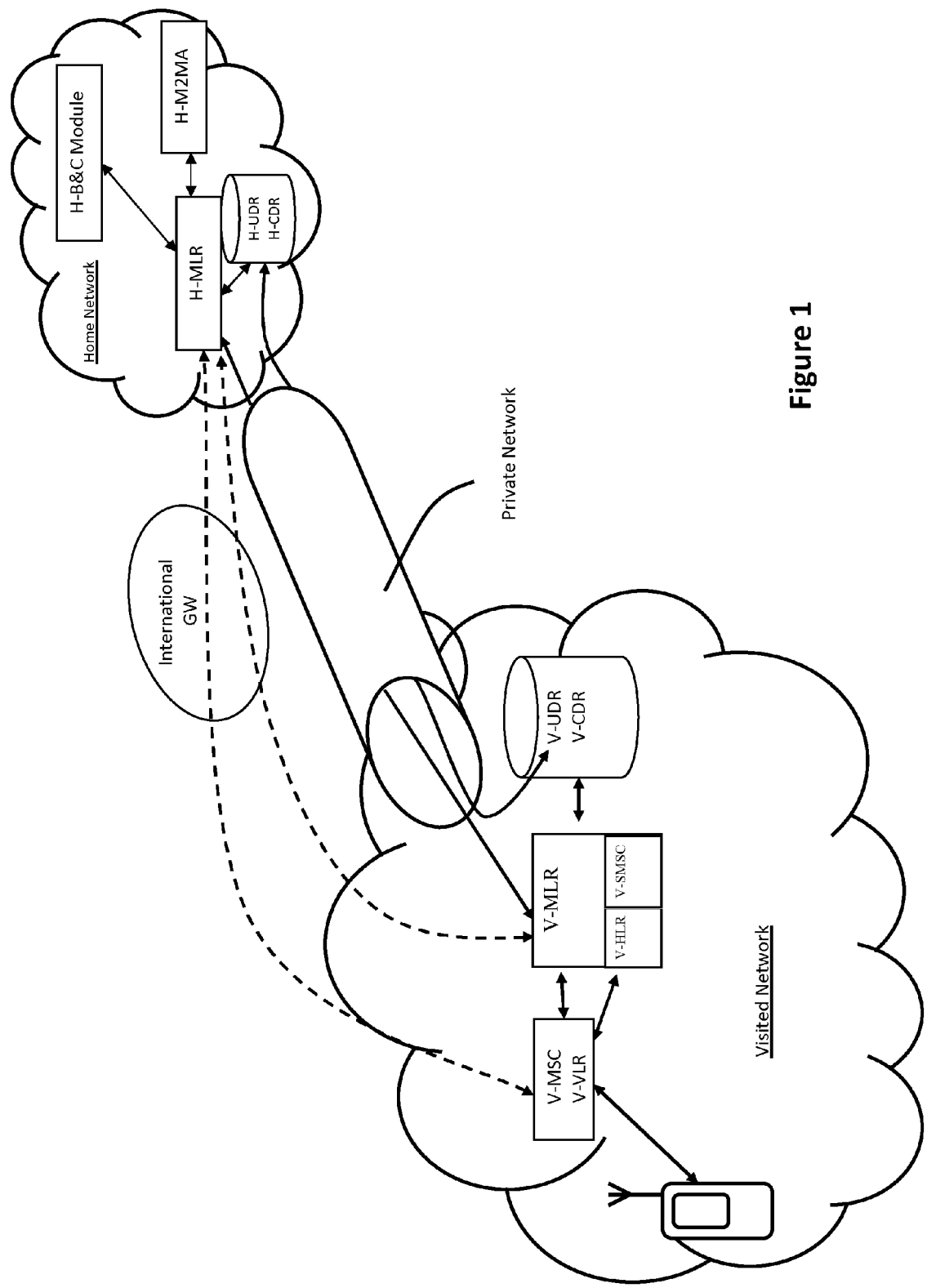

(51) Int. Cl.
  *H04W 8/04* (2009.01)
  *H04W 88/16* (2009.01)
  *H04W 88/18* (2009.01)
  *H04L 29/12* (2006.01)
(52) U.S. Cl.
  CPC ............... *H04L 61/605* (2013.01); *H04W 8/04* (2013.01); *H04W 88/16* (2013.01); *H04W 88/184* (2013.01)

(56) References Cited

U.S. PATENT DOCUMENTS

2009/0061860 A1\* 3/2009 Jiang .................. H04M 3/2281
   455/433
2011/0019626 A1\* 1/2011 Karaoguz ............... H04L 41/14
   370/329

\* cited by examiner

METHOD AND SYSTEM FOR PROVIDING COMMUNICATION SERVICES TO A ROAMING WIRELESS DEVICE

The technical domain of the invention is the domain of communication networks for wireless devices in roaming situation. The invention is particularly advantageous for machine to machine (M2M) communications.

Roaming is the general term for referring to the ability for a wireless device registered in a home telecom network to get access to a network service through a visited telecom network. It ensures that the wireless device is seamlessly kept connected to the network, without losing the connection, while it is located outside the geographical coverage area of its home telecom network. Roaming usually involves mobility management, authentication, authorization and billing procedures.

Roaming usually enables a wireless device to make and receive voice calls, send and receive data, or access other services, including home data services by means of using a visited network. The present application turns out to be particularly advantageous for, but is not limited to, SMS, USSD and data such as IP packets.

When a wireless device is turned on or is transferred via a handover to the network, this visited network reads the identity of the device through the IMSI number stored in the SIM card and then notices that the wireless device is not registered with the visited network. Then, this visited network identifies the home network of the device based on the IMSI. If there is no roaming agreement between the two networks, service is impossible and connection will be denied by the visited network. If the visited network knows how to contact the home network, it requests service information (including whether or not the mobile should be allowed to roam) about the roaming wireless device using the IMSI number. The visited network also contacts the home network each time the authentication vectors must be renewed. Once authentication is successfully completed, the visited network maintains a temporary subscriber record for the wireless device. Likewise, the home network updates its information to indicate that the wireless device is roaming on the visited network so that any information sent to that wireless device can be correctly routed. Home and visited communication networks are therefore interconnected.

Roaming situations are for instance disclosed in the following documents solutions US2007/293216, "ETSI TR 123 909 V4.0; Digital cellular telecommunications system (Phase 2+) (GSM); Universal Mobile Telecommunications System (UMTS); Technical Report on the Gateway Location Register (3GPP TR 23.909 version 4.0.0 Release 4)" et US2003/129991.

During a roaming situation the wireless device uses radio resources of the visited network and all steps regarding customer authentication, authorization and billing are performed in the home network. In addition, when a call or data session is established from the roaming wireless device, the resources of the home network are used to send/receive data.

Therefore, for each communication involving a roaming wireless device, information need to be transferred between the home and the visited networks.

Usually this information is exchanged through international gateways in charge of interconnecting the various networks. The usage of international gateways implies fees payment which leads to extra communication costs that are charged to the home network operator.

The impact of extra communication cost is usually very significant when the roaming wireless devices are communication terminals used for Machine to Machine (hereafter M2M) communications. Indeed, communications between two machines can be very frequent or with few data transmitted, which renders predominant the extra communication costs due to international gateways.

Some network operators have deployed wireless networks through several countries which allows avoiding the use of international gateways for roaming situation where the visited network and the home network belong to the same operator. This solution allows reducing the operational cost of roaming. However, the known solutions for deploying networks involve high investments. Typically, the network is one of: a Global System for Mobile Communications (GSM) network, CDMA2000 or WCDMA (Wideband Code Division Multiple Access).

Therefore, the known solutions are not adapted to a massive deployment of roaming situations and more particularly to a massive deployment of M2M wireless devices capable to roam.

An object of the present invention is to provide a solution to ease roaming situations.

According to an embodiment, the invention describes a method of providing a communication service for a wireless device registered in a home network and that is roaming in a visited network, the network comprising routing means (STP, V-MSC/VLR, V-SGSN), the method comprising the following steps:

provisioning the routing means (STP, V-MSC/VLR, V-SGSN) of the visited network with a plurality of identifiers that identify a plurality of wireless devices that are registered in the home network, defining thereby in the visited network a plurality of provisioned wireless device, each identifier identifying a wireless device;

provisioning the routing means (STP, V-MSC/VLR, V-SGSN) of the visited network with an address of a module (V-MLR) located in the visited network and comprising at least a home location register (V-HLR), and assigning the address of the module (V-MLR) to the plurality of identifiers provisioned in the routing means (STP, V-MSC/VLR, V-SGSN), so that the routing means (STP, V-MSC/VLR, V-SGSN) can retrieve the address of the module (V-MLR) located in the visited network based on an identifier of the plurality of provisioned identifiers;

at the routing means (STP, V-MSC/VLR, V-SGSN) of the visited network: receiving a message from a wireless device, the message comprising at least an identifier; determining, based on said identifier, whether the message is received from a provisioned wireless device; if the message is received from a provisioned wireless device, then routing the message to the module (V-MLR) located in the visited network and comprising at least a home location register (V-HLR).

The routing being done by retrieving the address of the module MLR.

Thus, if the wireless device has been previously provisioned in the visited network, then the message is automatically kept in the visited network for reaching a HLR of the visited network and is not sent to a home location register of the home network as it is the case with the known solutions, avoiding thereby using international gateways.

If the message is received from a wireless device that is not provisioned in the visited network but that is registered in another network, then the invention allows routing the message to a home location register (H-HLR) of said other network.

For instance, the routing means comprise at least a table storing the plurality of identifiers and the address of said module, such that when entering an identifier of the plurality of identifiers provisioned in the routing means it is then possible to retrieve the address of the module.

Optionally, the invention may comprise any one of the following facultative features and steps:

Preferably, the message comprises at least one of: a request for attachment, a message for update location.

In all the present invention the wording wireless device can be a mobile terminal or a measuring mobile terminal (MMT).

According to one embodiment, the message comprises a request for attachment; the routing means (STP, V-MSC/VLR, V-SGSN) determines that the message is received from a provisioned wireless device and in response routes the message to said module (V-MLR) located in the visited network; said module (V-MLR) located in the visited network changes the recipient address of the message to indicate a module (H-MLR) located in the home network and comprising at least a home location register (H-HLR) for the home network, and routes the message to said module (H-MLR) located in the home network.

Preferably, said module (H-MLR) located in the home generates an authentication vector and sends the outcome of the authentication vector generation to the routing means (STP, V-MSC/VLR, V-SGSN) that received the message from the wireless device. Thus, the routing means (STP, V-MSC/VLR, V-SGSN) of the visited network that received the message from the wireless device receive the outcome of an authentication vector from a module (H-MLR) located in the home network.

Preferably, the method comprises provisioning at least one user data repository (V-UDR) located in the visited network with the plurality of identifiers and with profile data associated to the identifiers, the user data repository (V-UDR) being connected to the module (V-MLR) located in the visited network.

According to one embodiment, the method comprises at least a phase of update location of the wireless device, the phase of update location comprising the following steps:
  an end-to-end routing equipment (V-MSC/V-VLR, V-SGSN) comprised in the routing means (STP, V-MSC/VLR, V-SGSN) sends to said module (V-MLR) located in the visited network a message for update location, the message for update location comprising at least a wireless device identifier for the wireless device,
  said module (V-MLR) located in the visited network retrieves from the user data repository (V-UDR) profile data based on the wireless device identifier,
  said module (V-MLR) located in the visited network sends to the end-to-end routing equipment (V-MSC/V-VLR, V-SGSN) the profile data.

Advantageously, the message for update location comprises an association of two wireless device identifiers (IMSI, IMEI) and the module (V-MLR) checks whether said association matches a combination of these device identifiers stored in the V-UDR. This allows enhancing the security of the checks before enabling the attachment.

More precisely, one identifier is the IMEI as sent by the wireless device if present in the Update location message. This IMEI is then checked against an IMEI, an IMEI list or a TAC or a TAC list stored in UDR. The module (V-MLR) retrieves from the V-UDR the profile data based on the identifiers only if the associations match.

Preferably, the end-to-end routing equipment (V-MSC/V-VLR, V-SGSN) sends to said module (V-MLR) located in the visited network an acknowledgment message for subscribed data insertion (ISD), and said module (V-MLR) sends to the end-to-end routing equipment (V-MSC/V-VLR, V-SGSN) an acknowledgment message for update location.

Preferably, a phase of attachment authorization check is performed based at least on the profile data. If the outcome of the attachment authorization check allows the authorization of the attachment, then, after reception of the acknowledgment message for update location at the end-to-end routing equipment (V-MSC/V-VLR, V-SGSN), the end-to-end routing equipment (V-MSC/V-VLR, V-SGSN) allows the attachment of the wireless device to the visited network.

Preferably, an additional phase of authentication is performed before the attachment of the wireless device to the visited network.

Preferably, said module (V-MLR) updates after reception of the MAP update location message the user data repository (UDR) for the visited network with the address of the end-to-end routing equipment (V-MSC/V-VLR, V-SGSN) that receives the message from the wireless device Advantageously, the messages related to update location, the profile data, the acknowledgment message for ISD and the acknowledgment message for ISD are sent between elements of the visited network only. Therefore, neither resources of the home network or international gateways are used.

According to one embodiment, the method comprises the following steps:
  prior to the step of receiving a message from a wireless device at the routing means (STP, V-MSC/V-VLR, V-SGSN), the wireless device is provisioned with a common address for a plurality of core network delivery equipments (V-SMSC, V-GGSN, H-SMSC, H-GGSN) located in different networks and in charge of rendering the message available to a recipient of the message, one of the core network delivery equipment (V-SMSC, V-GGSN) being located in the visited network,
  at the routing means (STP, V-MSC/VLR, V-SGSN) located in a visited network, receiving a content message (SMS, USSD, IP packets with data) from a wireless device, the content message comprising said common address for the plurality of core network delivery equipments (V-SMSC, V-GGSN, H-SMSC, H-GGSN),
  based on the common address, routing the content message through the routing means (STP, V-MSC/VLR, V-SGSN) of the visited network to the core network delivery equipment (V-SMSC, V-GGSN) located in the visited network.

According to one embodiment, the routing means comprises an end-to-end routing equipment that is a mobile switching center (V-MSC) of the visited network associated to a visitor location register (V-VLR) of the visited network and the core network routing device is a short message service center (V-SMSC) of the visited network.

According to an alternative embodiment, the routing means comprises an end-to-end routing equipment that is a Serving GPRS Support Node (V-SGSN) of the visited network and the core network routing device is a Gateway GPRS Support Node (V-GGSN) of the visited network.

Preferably, the core network delivery equipment (V-SMSC, V-GGSN) located in the visited network is embedded in the module (V-MLR) located in the visited network.

Preferably, the core network delivery equipment (V-SMSC, V-GGSN) located in the visited network sends for storage the content message (SMS, USSD, IP packets with data) to a content data repository (V-CDR) located in the visited network.

According to one embodiment, the content data repository (V-CDR) is accessed by an element located outside the visited network, the element being any one of: a module (H-MLR) located in the home network and comprising at least a home location register (H-HLR) for the home network, a machine to machine application (H-M2MA) located outside the visited network, a machine to machine application gateway (H-M2MAGW) located outside the visited network and enabling communication of a machine to machine application (H-M2MA) located outside the visited network, a machine to machine service platform (H-MSP) located outside the visited network and comprising a machine to machine application and a machine to machine application gateway that interfaces the machine to machine application, another data repository (H-CRD) located outside the visited network and configured to access the data of the content data repository (V-CDR).

Preferably, said element located outside the visited network reads or retrieves the data of the content message stored in the content data repository (V-CDR).

Advantageously, the element located outside the visited network accesses the content data repository (V-CDR) through a private network.

Preferably, UDR and CDR are data repositories that allow, preferably through the MLR, exhibit the capability of updating data and retrieving data. Software applications like M2M applications or gateways associated to software applications are configured to read the UDR and CDR and to process the stored data.

An UDR located in a network has also the capability to read or to retrieve data stored in an UDR located in another network.

According to an advantageous embodiment, a software application or a gateway that interfaces a software application is configured to connect a local UDR located in the network where said software application runs and to read through the local UDR another UDR that is located in another network. Preferably, the UDR are connected through private networks. UDR and CDR also offer the capability to receive locally a notification message when an update if perform on a remote UDR or CDR.

According to an advantageous embodiment, the user data repository (V-UDR) and the content data repository (V-CDR) form a single repository.

According to one embodiment, the machine to machine application (H-M2MA) is located in the home network. Preferably, the module (H-MLR) located in the home network accesses the content data repository (V-CDR) through a private network. Preferably, the module (H-MLR) located in the home network sends the message content to a machine to machine application located in the home network for processing of the content of the content message.

Preferably, upon storage of the content message in the content data repository (V-CDR), the core network delivery equipment (V-SMSC, V-GGSN) sends an acknowledgment for the message content to the end-to-end routing equipment (V-MSC/V-VLR, V-SGSN).

According to one embodiment, the user data repository (V-UDR) located in the visited network is populated with billing and/or traffic data; an element located in the home network retrieves the billing and/or traffic data from the user data repository (V-UDR) and provides the data to a billing module or a charging module located outside the visited network for further processing, the element being any one of: a module (H-MLR) located in the home network and comprising at least a home location register (H-HLR) for the home network, a billing or charging application gateway located outside the visited network and interfaces the billing module or the charging module, another data repository (H-CRD) located outside the visited network and configured to access the data of the content data repository (V-CDR).

Advantageously, the billing module or the charging module is located in the home network.

Preferably, the module (H-MLR) located in the home network accesses the user data repository (V-UDR) through a private network to get information such as data volume or duration to be charged. Information concerning subscriber identification or account characteristics are kept in home network. Therefore, all billing and traffic information are kept private in the home network.

Another object of the present invention relates to a system for system for providing a communication service for a wireless device registered in a home network and that is roaming in a visited network comprising routing means (STP, V-MSC/VLR, V-SGSN), the system being characterized in that:

the routing means (STP, V-MSC/VLR, V-SGSN) of the visited network are configured to be provisioned with a plurality of identifiers that identify a plurality of wireless devices that are registered in the home network, defining thereby a plurality of provisioned wireless device for the visited network;

the system comprises a module (V-MLR) located in the visited network and comprising at least a home location register (V-HLR), the routing means (STP, V-MSC/VLR, V-SGSN) of the visited network are configured to be provisioned with an address of said module (V-MLR), and to access the address of said module (V-MLR) based on any identifier of the plurality of provisioned identifiers;

the routing means of the visited network comprises at least some routing equipments (STP, V-MSC/VLR, V-SGSN) that are configured to:

receive from a wireless device a message comprising at least an identifier determine, based on said identifier, whether the message is received from a provisioned wireless device;

route the message to said module (V-MLR) if the message is received from a provisioned wireless device.

According to another embodiment, the invention provides a method of providing a communication service for a wireless device registered in a home network and that is roaming in a visited network that comprises routing means (STP, V-MSC/VLR, V-SGSN), characterized in that it comprises the following steps:

provisioning a wireless device intended to roam with a common address for a plurality of core network delivery equipments (V-SMSC, V-GGSN, H-SMSC, H-GGSN) located in different networks, at the routing means (STP, V-MSC/VLR, V-SGSN) located in a visited network, receiving a message from a wireless device, the message comprising said common address of the plurality of core network delivery equipments (V-SMSC, V-GGSN, H-SMSC, H-GGSN), routing the message through the routing means (STP, V-MSC/VLR, V-SGSN) of the visited network to a core network delivery equipment (V-SMSC, V-GGSN) of the visited network.

The core delivery device equipment is preferably a SMSC or a GGSN of the visited network. Thus, the message like SMS or IP packets with data are routed from the wireless device to a core network delivery equipment of the visited network without being sent to a core network delivery equipment of the home network, avoiding thereby using international gateways.

Another object of the invention relates to a communication network system according to the invention, and comprising at least a core network delivery equipment (V-SMSC, V-GGSN).

Another object of the invention relates to a non-transitory computer-readable medium that contains software program instructions, where execution of the software program instructions by at least one data processor results in performance of operations that comprise execution of the method according to the invention.

According to an embodiment, the invention provides a method of providing a communication service for a wireless device registered in a home network and that is roaming in a visited network, characterized in that it comprises the following steps:

provisioning at least one user data repository (V-UDR) located in the visited network with a plurality of wireless device identifiers (for instance IMSI, ranges of IMSI, IMEI, range of IMEI, TAC, ranges of TAC) and profile data for wireless devices that are registered in the home network, defining thereby a plurality of provisioned wireless devices for the visited network, the user data repository (V-UDR) being connected to a module (V-MLR) located in the visited network and comprising at least a home location register (V-HLR) for the visited network, at an end-to-end routing equipment (V-MSC/VLR, V-SGSN) located in the visited network:

receiving a message from a wireless device located in a geographical area dedicated to the end-to-end routing equipment (V-MSC/V-VLR, V-SGSN);

determining whether the message is received from a provisioned wireless devices;

if the message is received from a provisioned wireless device, then routing the message to at least one of: said module (V-MLR) and a core network delivery equipment (V-SMSC, V-GGSN) located in the visited network and in charge of rendering the message available to a recipient of the message.

Figure 2:
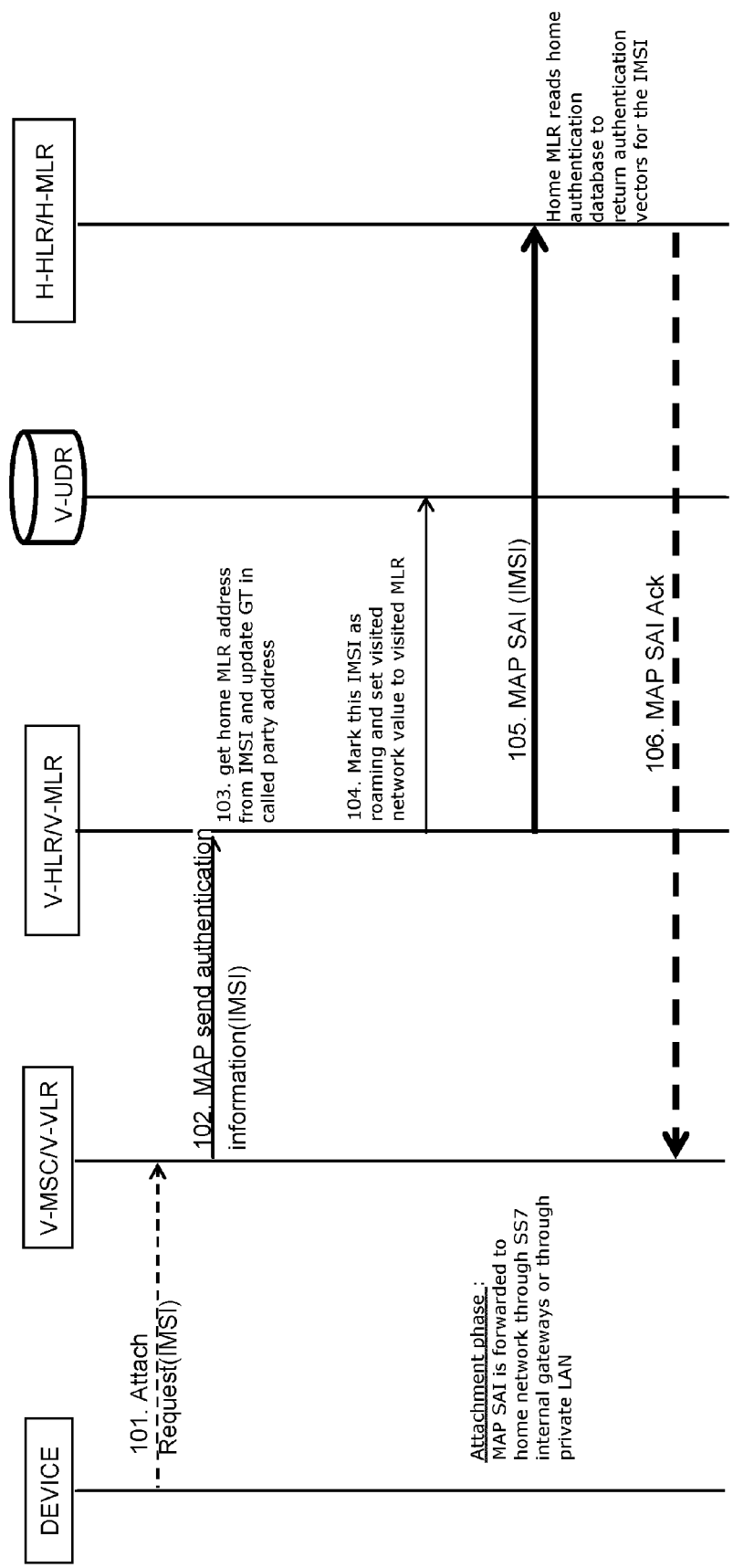
Figure 3:
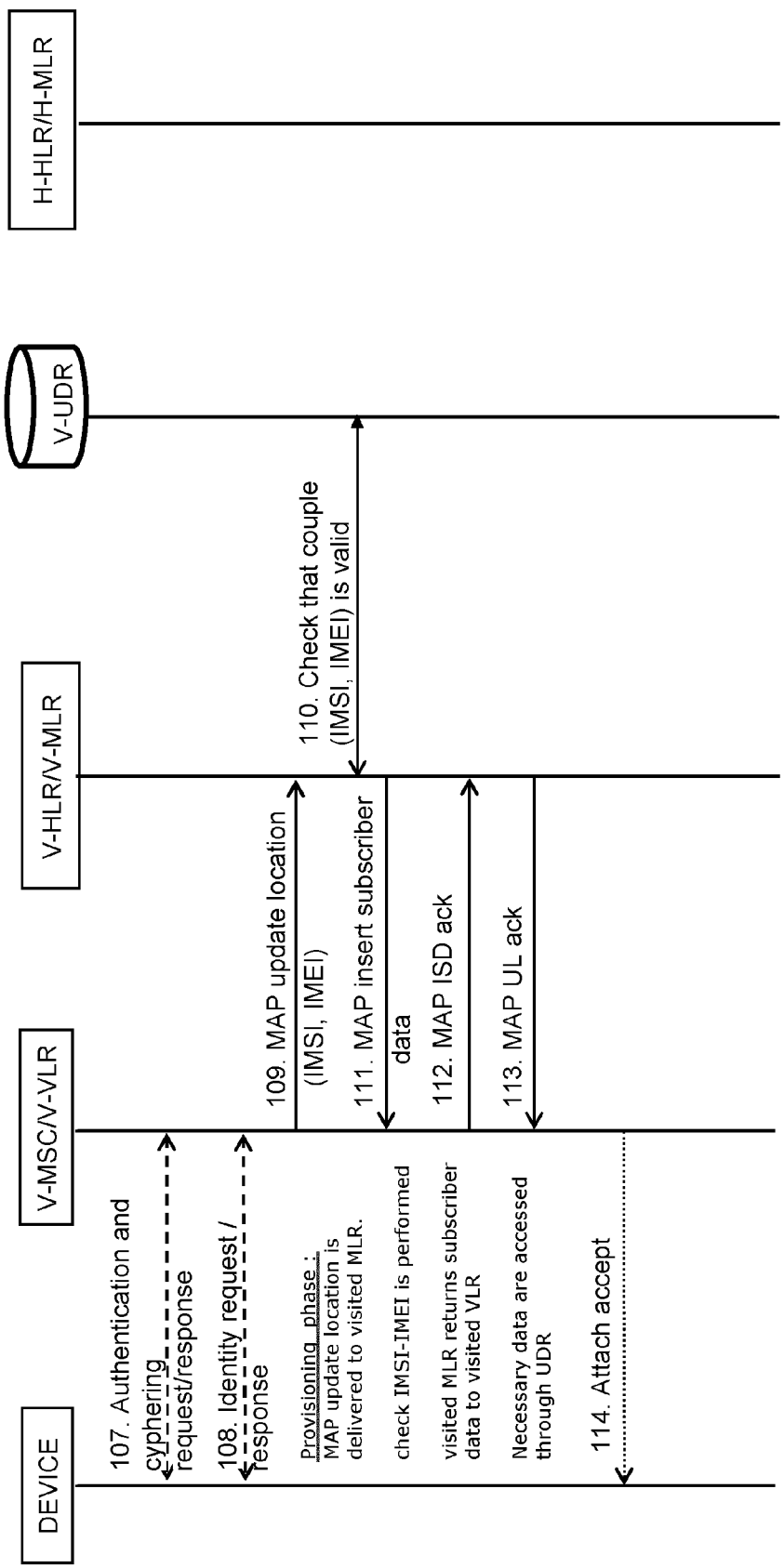
Figure 4:
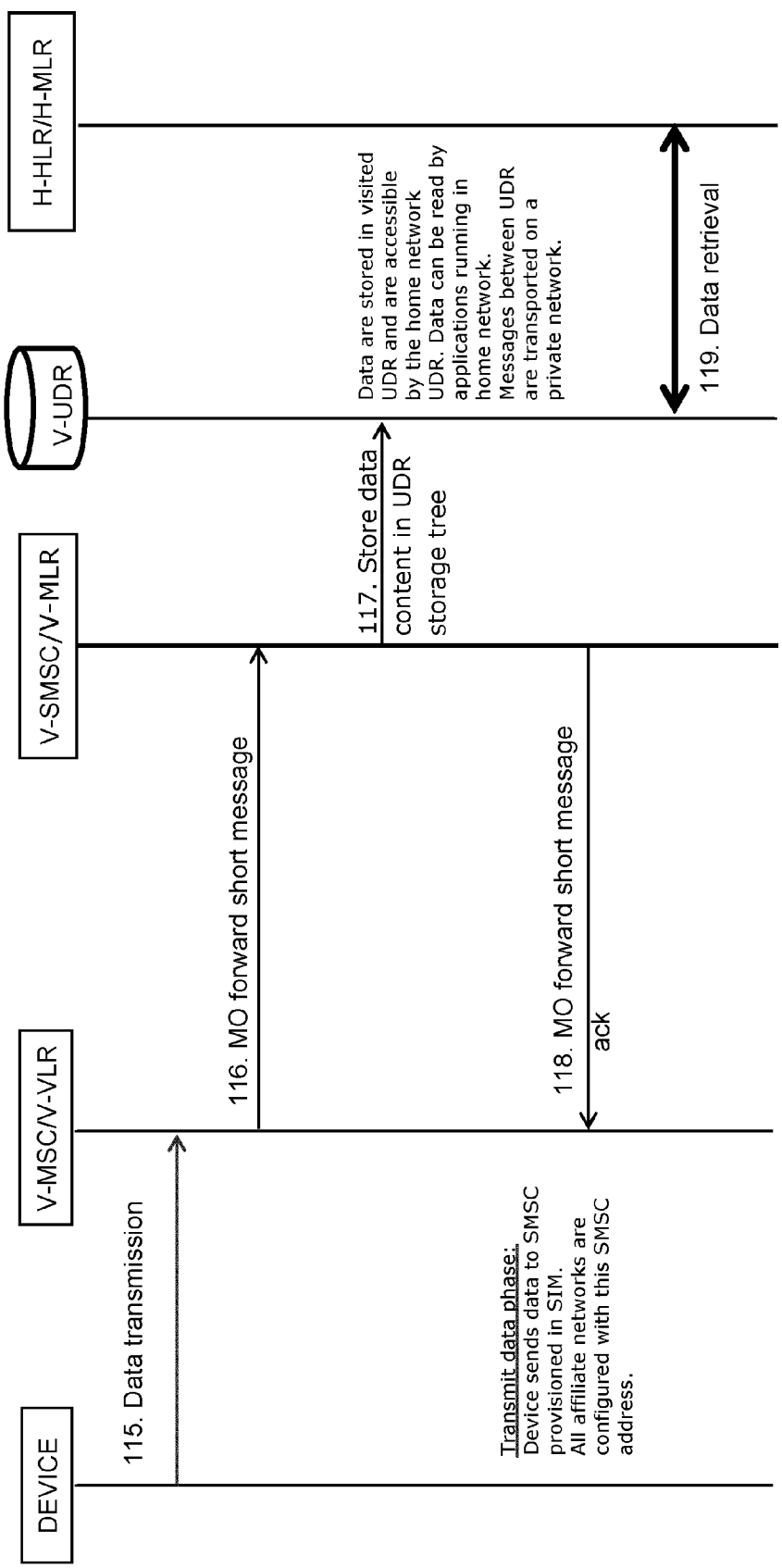
Figure 5:
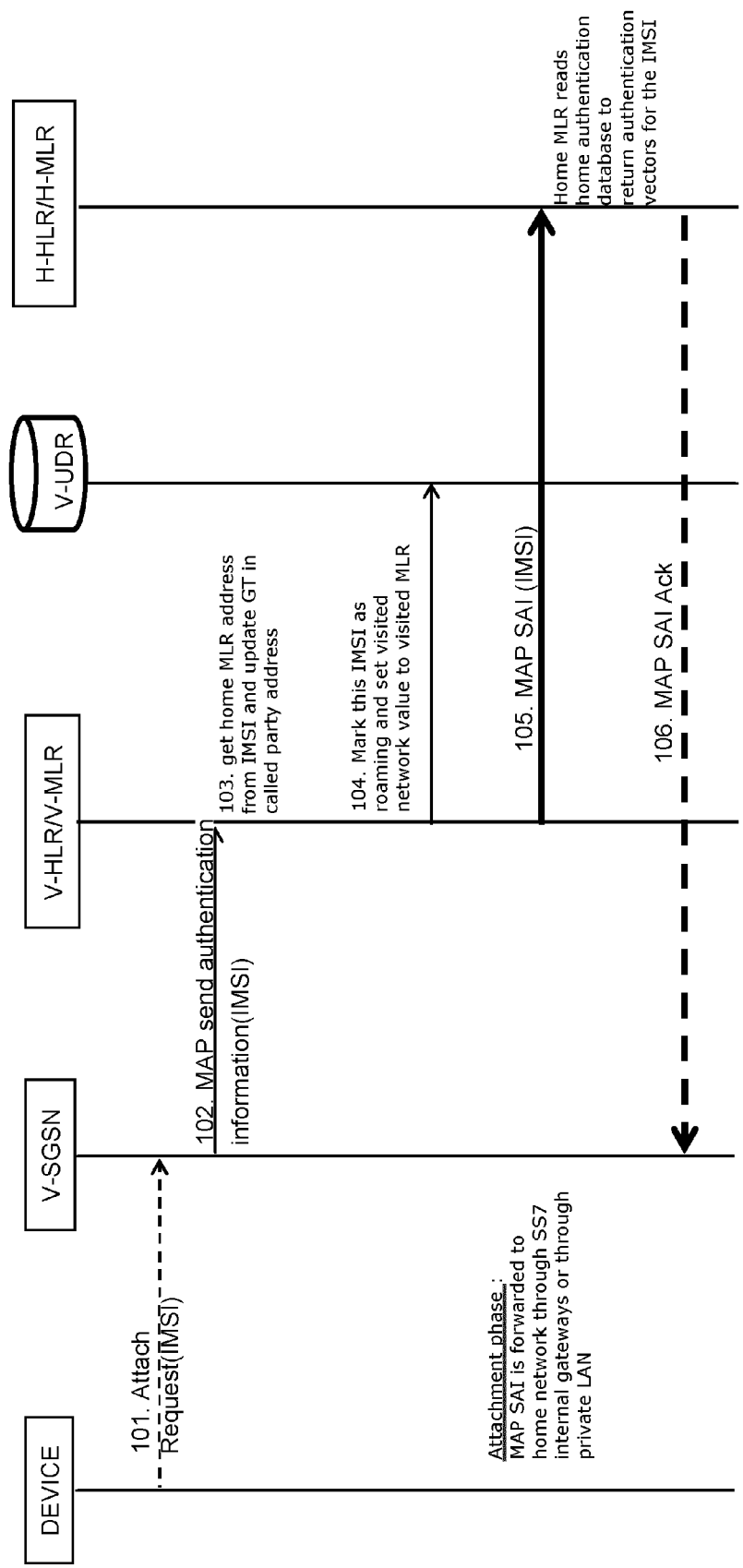
Figure 6:
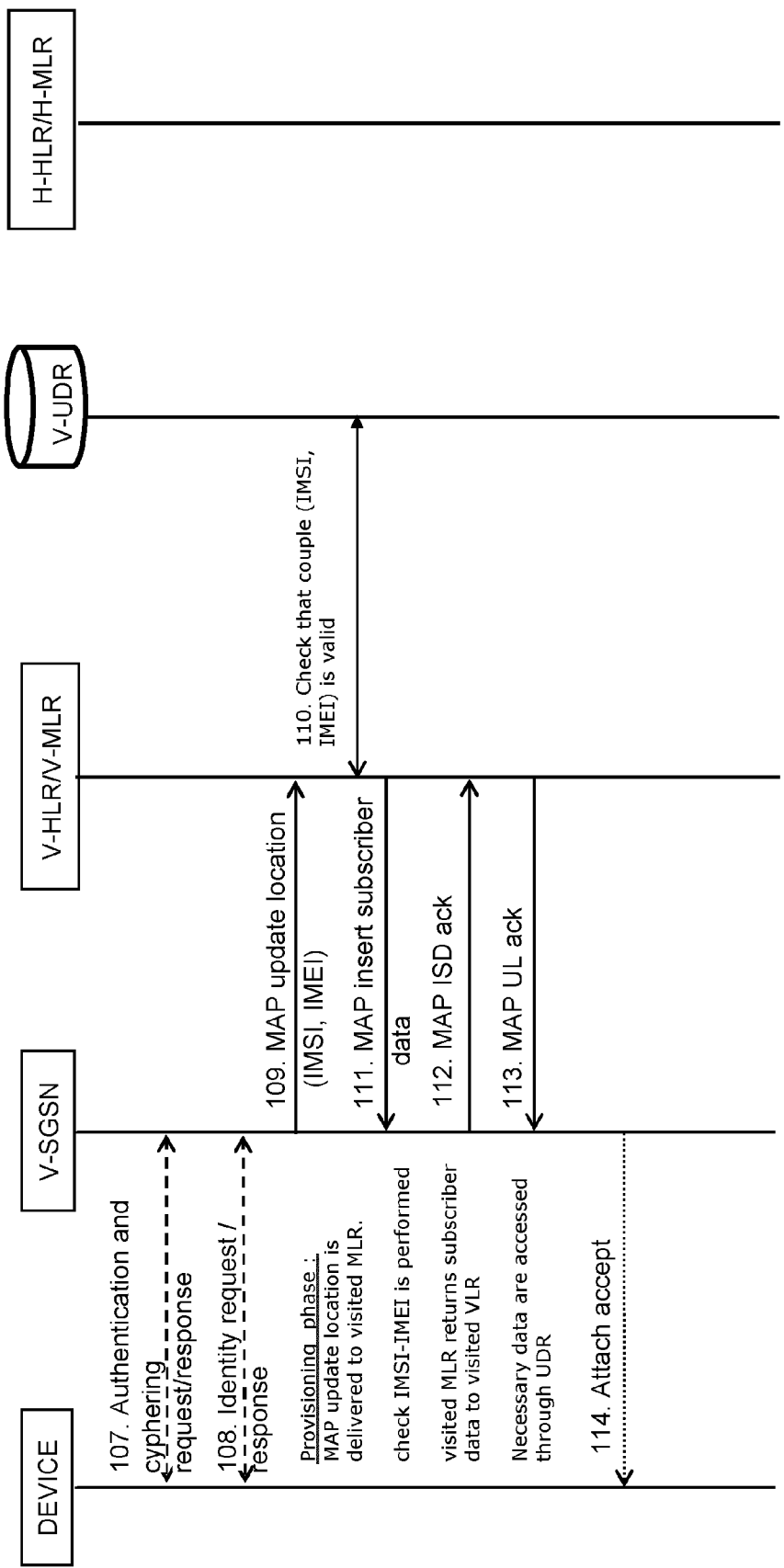
Figure 7:
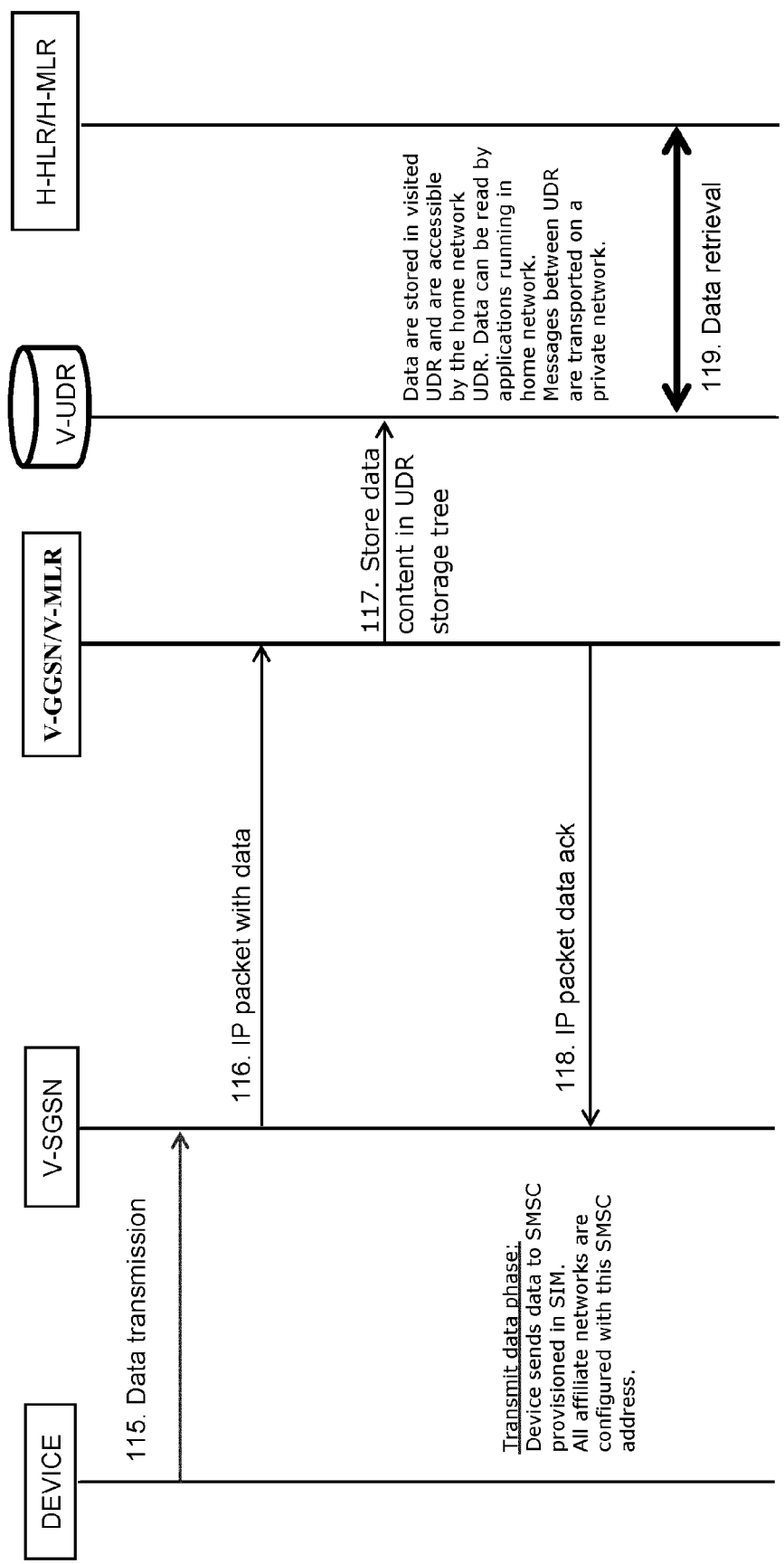
Figure 8:
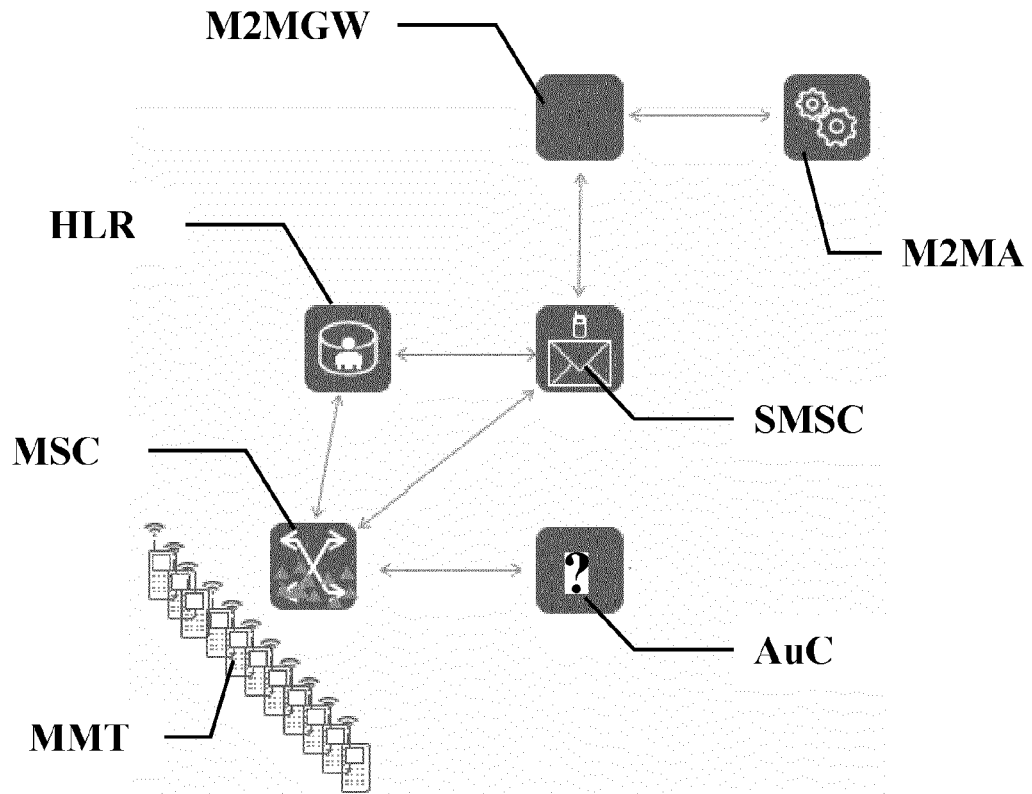
Figure 9:
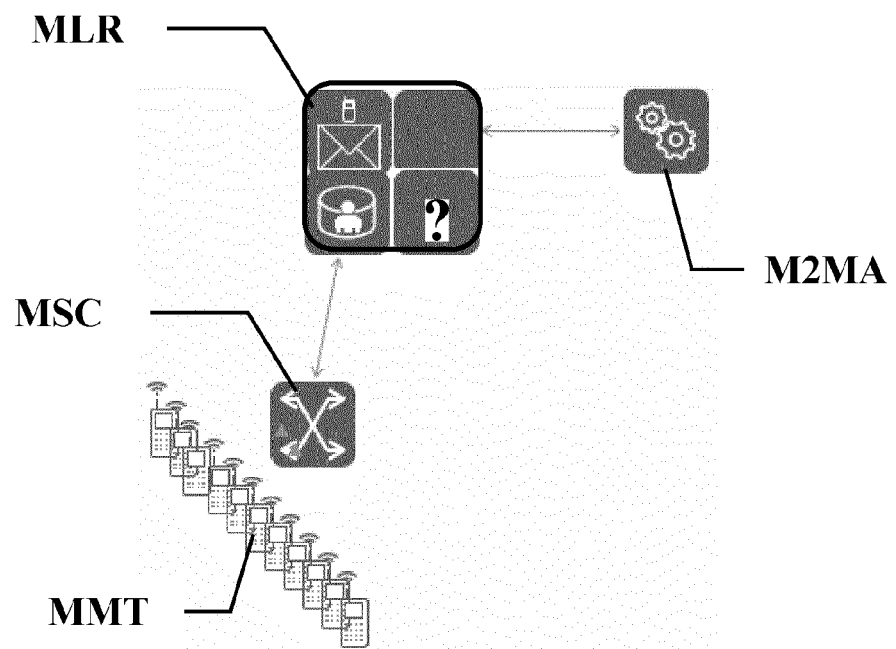
Figure 10:
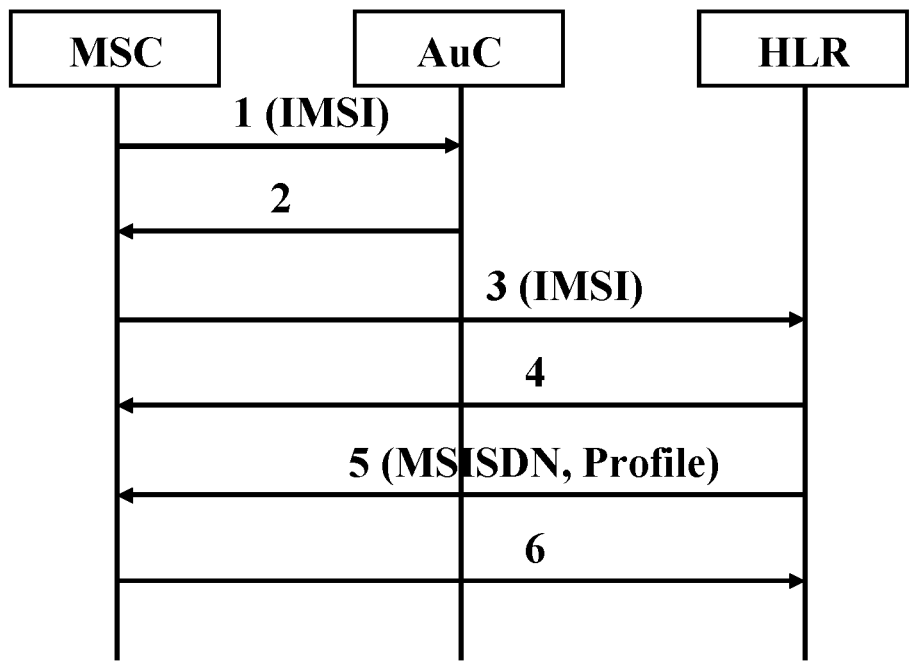
Figure 11:
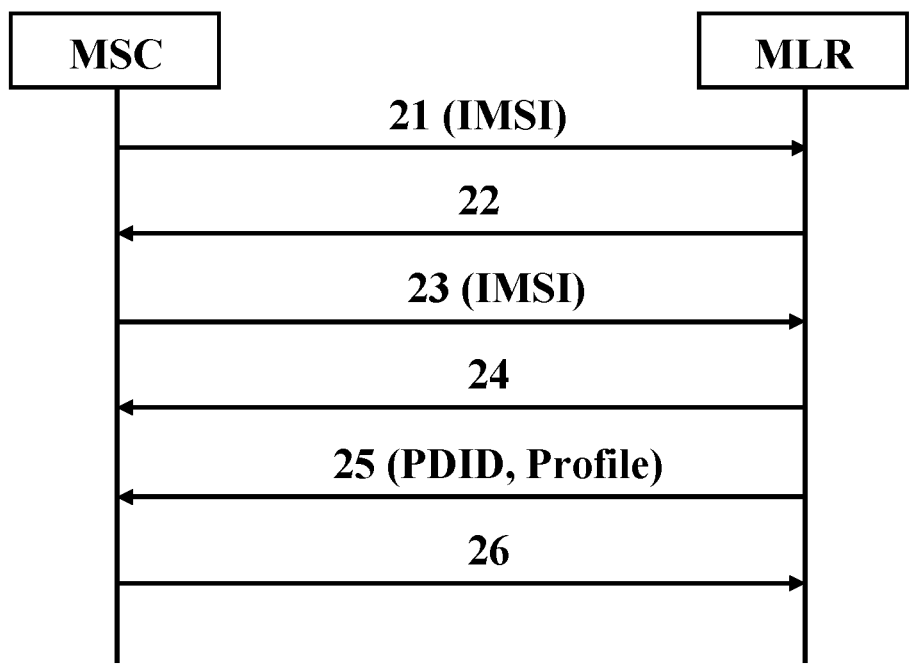
Figure 12:
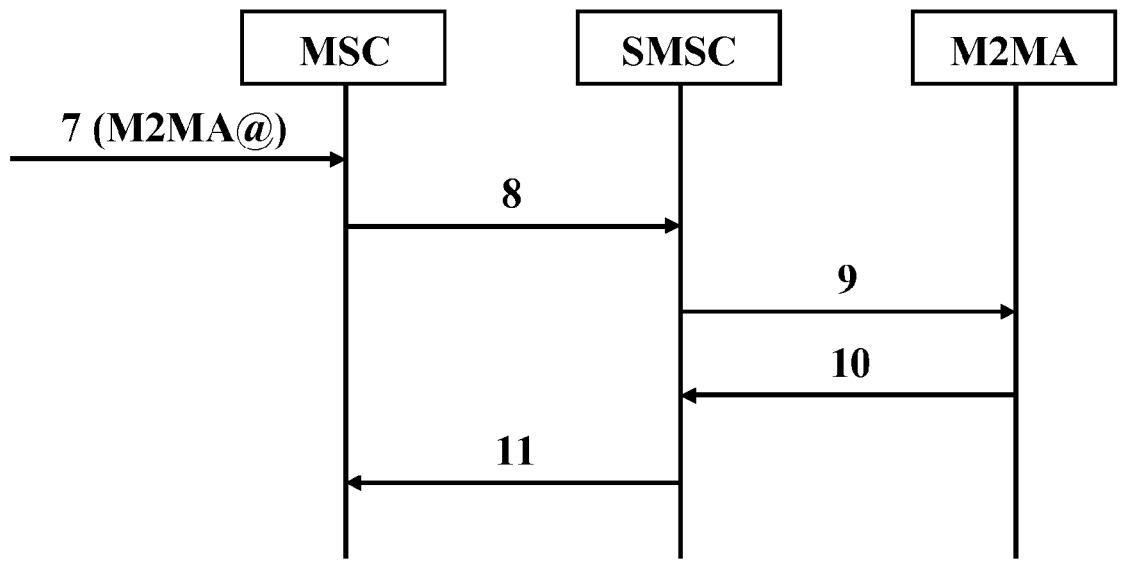
Figure 13:
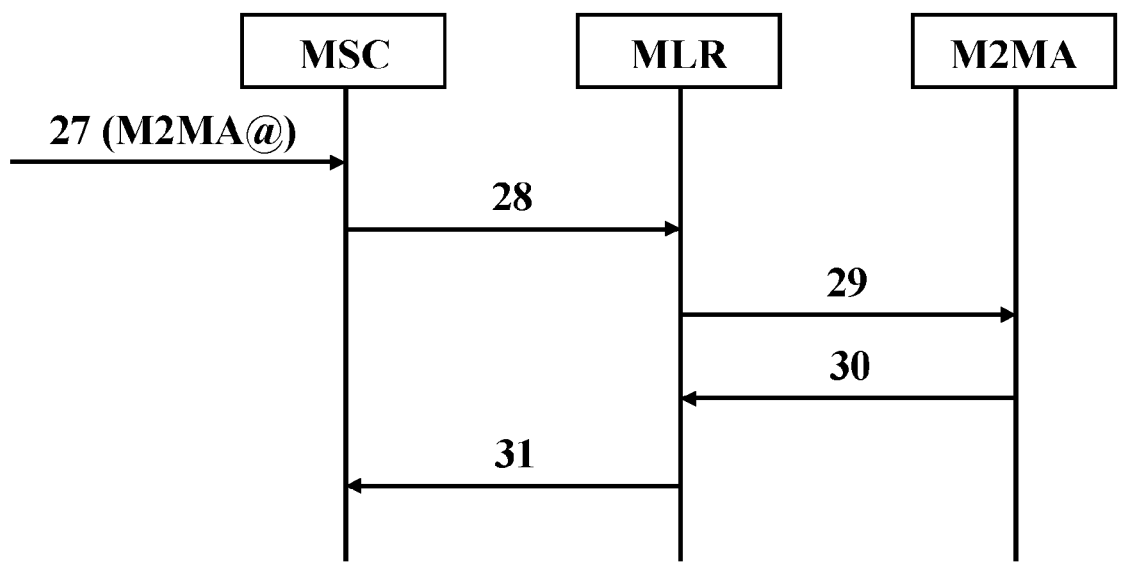
Figure 14:
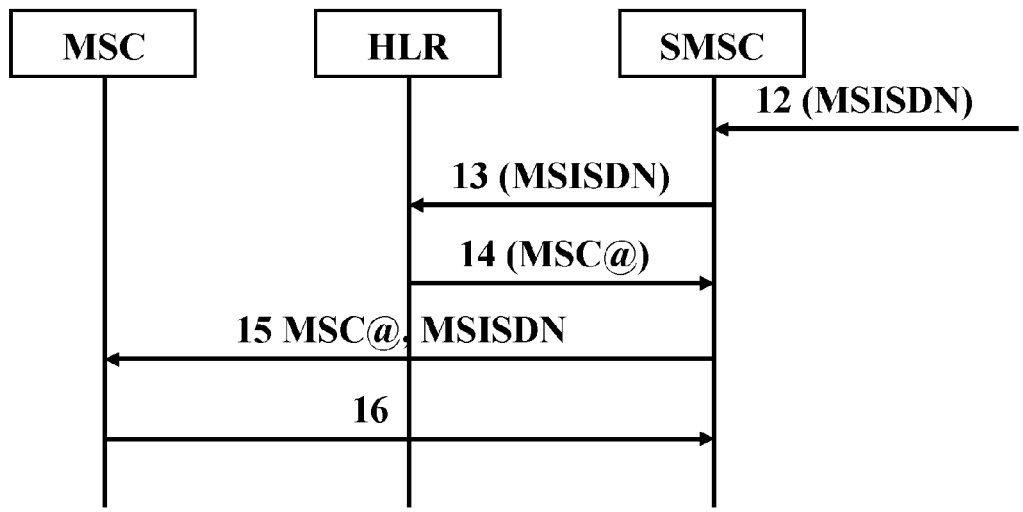
Figure 15:
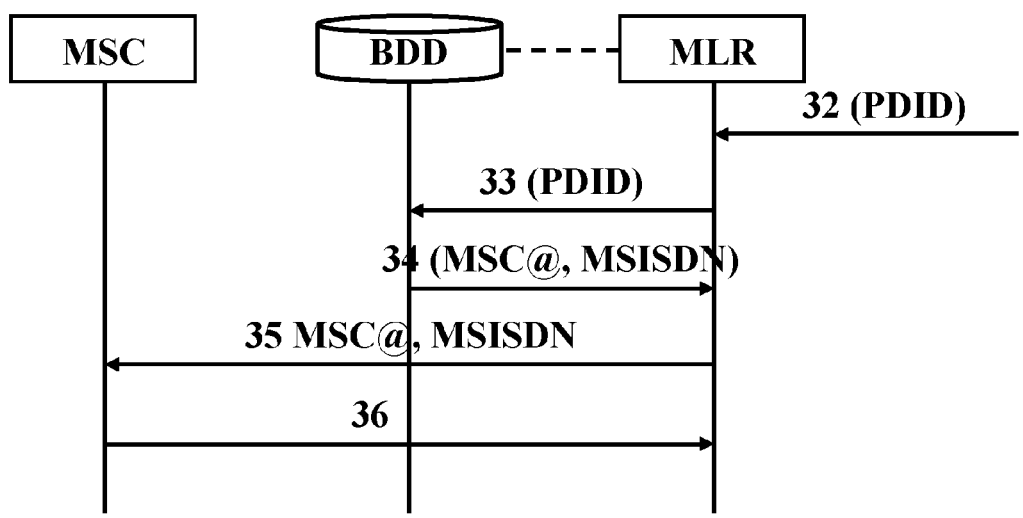

Others features, details and advantages of the invention will become apparent from the detailed description given hereafter with respect to the drawings on which:

FIG. 1 shows a schematic view of a communication network comprising an exemplary embodiment of a system according to the invention, FIG. 2 shows a first example of a flow diagram of exchanges, during an attachment phase of a wireless device, according to an embodiment of the invention, FIG. 3 shows a first example of a flow diagram of exchanges, during a phase of wireless device location update, according to an embodiment of the invention, FIG. 4 shows a first example of a flow diagram of exchanges, during a data transmission phase from the wireless device, according to an embodiment of the invention, FIG. 5 shows a second example of a flow diagram of exchanges, during an attachment phase of a wireless device, according to an embodiment of the invention, FIG. 6 shows a second example of a flow diagram of exchanges, during a phase of wireless device location update, according to an embodiment of the invention, FIG. 7 shows a second example of a flow diagram of exchanges, during a data transmission phase from the wireless device, according to an embodiment of the invention, FIG. 8 shows a schematic view of a communication network according to prior art, FIG. 9 shows a schematic view of a communication network equipped with a module MLR, FIG. 10 shows a flow diagram of exchanges between elements, during the connection of a terminal, according to prior art, FIG. 11 shows a flow diagram of exchanges between the elements, during the connection of a terminal, the connection involving a module MLR, FIG. 12 shows a flow diagram of exchanges between the elements, during the sending of a message FROM a terminal, according to prior art, FIG. 13 shows a flow diagram of exchanges between the elements, during the sending of a message FROM a terminal, the sending of a message involving a module MLR, FIG. 14 shows a flow diagram of exchanges between the elements, during the sending of a message TO a terminal, according to prior art, FIG. 15 shows a flow diagram of exchanges between the elements, during the sending of a message TO a terminal, the sending of a message involving a module MLR.

FIG. 1 and FIGS. 2 to 4 illustrates a non limitative exemplary embodiment of the invention where the wireless device intends to transmit messages, such as Short Message Services (SMS) messages, typically to a machine to machine application.

The invention is however not limited to transmission of SMS messages and an exemplary embodiment involving the transmission of data such as IP (Internet Protocol) packets will be further described in reference to FIGS. 5 to 7.

In the following, the cellular communication radio network is considered to be an existing cellular communication network, such as GSM or equivalent. In order to be clearer to the one skilled in the art, description is given hereafter using the usual vocabulary of the GSM protocol and, more particularly, of the Signaling System 7, SS7. However, this must not be construed as a limitation to this protocol or system, and the teaching of the invention of the present patent is transposable to any cellular communication network.

FIG. 1 depicts various elements that are involved in a roaming situation according to an embodiment of the invention. The visited network comprises routing equipment and a core network delivery equipment both located in the visited network.

The routing means comprise various equipment such as Signaling Transfer Points (STP) and end-to-end routing equipment. In this exemplary embodiment where messages are SMS messages, the end-to-end routing equipment is a mobile switching center associated to a visitor location register and the core network delivery equipment is a short message service center. The mobile switching center associated to a visitor location register and the short message service center are located in the visited network and are respectively referred to as V-MSC/V-VLR and V-SMSC in the following. As it will be detailed below, the V-SMSC is optionally and preferably embodied in a module (V-MLR) that comprises additional module(s) usually present in a telecommunication network.

According to another embodiment where the wireless device sends data such as IP packets, for instance through packet oriented mobile data service (GPRS), the end-to-end routing equipment is a Serving GPRS Support Node and the core network delivery equipment is a Gateway GPRS Support Node. The Serving GPRS Support Node and the Gateway GPRS Support Node are both located in the visited network and are referred to as V-SGSN and V-GGSN in the following.

The system according to the invention comprises a module, referred to as V-MLR, that is located in the visited network. The V-MLR comprises a home location register (V-HLR) located in the visited network. The V-MLR is configured to enables the V-VLR to exchange data with other home location registers (HLR) that are not located in the visited network. Preferably the V-MLR is configured to enables the V-VLR to exchange data with other HLRs that are not located in the visited network and without using the Global System for Mobile Communications (GSM) protocol.

Therefore according to an embodiment, a MLR embeds a module user data repository UDR that is able to communicate with the user data repository UDR of the other networks, in particular for synchronizing their data, which implies that a given UDR knows the addresses of the other UDRs located in the foreign networks.

According to a preferred embodiment, the MLR also comprises the core network delivery equipment. This equipment is typically a V-SMSC for messages like SMS and a GGSN for IP packets with data. This embodiment is depicted on FIGS. 1, 4 and 7 where the V-SMSC is embedded in the V-MLR.

It should be noticed that while the visited network is equipped with a MLR that embeds a HLR and a SMSC, the visited network could also be possibly equipped with stand-alone a conventional HLR and a SMSC. These conventional equipments can route the message sent by wireless devices that have not been provisioned in the visited network.

According to another advantageous embodiment, the MLR also embeds an authentication module (AuC) that exhibits all functions usually performed by an authentication module to generate authentication vectors.

The MLR is configured to allow communication of all modules and equipment that is embeds. In particular, the UDR, the HLR and the SMSC comprised in the MLR can exchange messages.

Additional details regarding the MLR and how it operates will be further provided with reference to FIGS. 8 to 15. In this section, the MLR will be described in a situation where the wireless device is not roaming. Many of the features that are described in the section dedicated to the MLR are only optional and do not limit the scope of the present invention. It should also be noticed, that all the features and steps described in said section below dedicated to the MLR can be combined and associated with any features and steps described in the other sections of the description and in particular in the sections that refers to FIGS. 1 to 7.

The system according to the invention also comprises at least a data repository, referred to as visited user data repository (V-UDR), located in the visited network. The V-MLR can store and retrieve data in/from the V-UDR. According to a particular embodiment, the V-UDR is comprised in the V-MLR.

The home network is equipped with a module, referred to as H-MLR and that exhibits the same functionalities as the V-MLR. In particular, the H-MLR comprises a home location register (H-HLR) located in the home network. The H-MLR is configured to enables the V-VLR to exchange data with other HLR such as the V-HLR forming part of the V-MLR. Typically, the V-MLR and H-MLR can communicate together and to enable communication of their respective VLR.

Advantageously, the H-MLR and the V-MLR can communicate through a private network.

The home network also comprises at least a data repository, referred to as home user data repository (V-UDR) and a content data repository (V-CDR). The H-MLR can store and retrieve data in/from the H-UDR and the H-CDR. According to a particular embodiment, the H-UDR is comprised in the H-MLR.

UDR and CDR repository are configured to share their data over a network. The H-UDR is also configured to be notified when data are modified in the V-UDR. Typically, the operator of the H-UDR subscribes a service that automatically warns the H-UDR when fresh data are available in the V-UDR.

Advantageously, the H-UDR and the V-UDR can communicate through a private network.

In an embodiment where the wireless device operates M2M communication, There is a machine to machine application (M2MA) connected to the H-MLR. Advantageously, the machine to machine application is located in the home network and is thus referred to as H-M2MA.

The wireless device is able to collect at least one measure, for example periodically. For instance, the wireless device is able to collect a temperature, a pressure, an electrical or optical signal, a geographical location, a value etc. The machine to machine application M2MA is configured to centrally gather the measures collected by the wireless device and to process them.

FIG. 1 also illustrates an international gateway for communications between the V-MSC/V-VLR and the H-MLR, and for communication between the V-MLR and the H-MLR.

Communications can also use a private SS7 network instead of using international gateways.

As it will become apparent below, the invention allows optimizing the volume of roaming data transferred through handling by the visited network the data that are sent by the wireless devices without routing these data to the home network. International gateways are therefore not used or are used for much fewer communications, thereby decreasing the cost of roaming for telecommunication operators. In addition, the invention allows processing in the home network the charging operation that needs sensitive information, preserving thereby the security of data.

The operation and the functionalities of the elements depicted on FIG. 1 will be described below with reference to FIGS. 2 to 4 which respectively relates to: a phase of attachment request and authentication, a phase of location update, and a phase of data transmission. In addition, a previous step of pre-provisioning is performed before the wireless device tries to attach to the visited network. On the following diagram flows, the dotted arrows represent exchanges that are performed in the prior art while the other arrows are new.

Pre-Provisioning:

The visited network comprises many types of equipment that are in charge of the routing of the messages coming from the wireless devices for typically achieving attachment, authentication, location update and transmission of content messages such as SMS for instance.

These equipments form are referred to as routing means. Typically, the routing means of the visited network comprises routers such as Signaling Transfer Points (STP), end-to-end routing equipment such as Mobile Switching Centers (MSC) and Visitor Location Registers (VLR) associated to the Mobile Switching Centers, this association being usually referred as (MSC/VLR). These routing means are for instance configured to route SMS or USSD (Unstructured Supplementary Service Data) or Serving GPRS Support Nodes (SGSN) for transmission of IP packets. The routing means possibly embodies additional equipments.

According to the invention, the visited network is pre-provisioned with the address of the module V-MLR of the visited network. Preferably, the visited network is also pre-provisioned with the addresses of the modules MLR of the other networks, and in particular with the address of the module H-MLR located in the visited network.

According to the invention, the visited network is also pre-provisioned with wireless device identifiers of all wireless devices for which a possibility to roam in the visited network is granted by the operator of the home network. Preferably, the identifiers are provisioned by ranges.

According to an embodiment, the identifiers are IMSIs. According to an advantageous embodiment, the IMSIs are provisioned by ranges which eases and speeds the pre-provisioning. For instance, the routing equipments of the visited network receive MCC-MNC-[range of MSIN]. It is recalled that MCC refers to Mobile Country Code, that MNC refers to Mobile Network Code and that MSIN refers to Mobile Subscription Identification Number. IMSIs are preferably sent and stored in STPs, MSCs/VLRs.

Advantageously, the pre-provisioning typically also involves provisioning the Signaling Transfer Point (STP) with the address of the V-MLR.

More precisely, the network is configured to build the destination address of a message received from a wireless device into the address of the module MLR of the visited network. For instance, when a routing equipment such as a V-MSC receives a message from the wireless device, the Global Title of the message is build by adding the identifier of the originator, typically the IMSI (or part of the IMSI) of the wireless device. The message is then sent to another routing equipment such as a STP. Thanks to the pre-provisioning of the address of the local MLR and the pre-provisioning of the identifiers, the STP replaces the identifier in the Global Title by the address of the module V-MLR. Once, the address of the local MLR is determined from the Global Title, thus the message can be routed to the V-MLR.

Thus, the invention allows routing a message from a wireless device registered in the home network to a module V-MLR of the visited network.

Typically, the pre-provisioning of the routing means of the visited network is achieved through sending from the home network all data (address of the MLR and identifiers) for provisioning.

The user data repository (UDR) of each network is provisioned with various data.

First, each UDR contains the address of the other UDR or the other MLR located in the foreign networks. Thus, when a MLR can retrieve from its UDR the address of a foreign MLR and send a message to this foreign MLR.

Based on the provisioning of the UDRs, a H-HLR of a H-MLR can route messages to all HLR of the MLR of the foreign networks, and vice-versa, i.e., all the HLR of the various MLR know each other.

In addition, the UDR are provisioned with a common address assigned to all SMSC of the networks wherein the present invention can be implemented. This address is assigned to each SMSC in addition to a regular local address. Thus, as described with additional details below, a wireless device that only knows the common address for all SMSCs can reach, through the routing means (STP, MSC/VLR) of a given network, the SMSC of this given network. This routing is simpler in the embodiment where the module V-MLR embeds the SMSC.

The invention involves another pre-provisioning. Indeed the UDRs are pre-provisioned with data concerning the wireless devices. Typically, a V-MLR can access the data of a H-UDR, preferably through the V-UDR, in order to get data regarding subscribers registered in the home network.

Typically, the V-UDR embedded in the V-MLR receives from the H-UDR, wireless device identifiers for all wireless devices for which a possibility to roam in the visited network is granted by the operator of the home network.

The identifiers provisioned in the routing equipments (STP, V-MSC/V-VLR, V-SGSN) are also provisioned in the visited network and vice-versa.

Typically, the wireless device identifiers are International Mobile Subscriber Identity (IMSI).

Preferably, the IMSI are provided by ranges of IMSI, which eases and speeds the pre-provisioning. For instance, the V-MLR receives MCC-MNC-[range of MSIN].

The V-MLR, through its V-UDR, is also provided with a user profile associated to the wireless device, such profile generally contains for instance any one of the following data related to: credentials for operation such as roaming; indications regarding mobile originating SMS (MO-SMS), which allow determining whether the wireless device is entitled to send messages; indications regarding mobile terminating SMS (MT-SMS) which allow determining whether the wireless device is entitled to receive messages; the volume of data that is allowed to be sent/receive from/by the wireless device; time schedule that determines the time slots where the device is entitled to communicate, call duration that determines for instance the time duration for an attachment of the wireless device to the network etc. These data will further allow determining whether the attachment or the transmission of data should be allowed or denied.

Preferably, the IMSI are provided by ranges of IMSI with their user profile.

The V-MLR is also provisioned with at least an additional identifier of the wireless device that is different from the IMSI. While the IMSI is usually associated to a subscriber identity module (SIM), this additional identifier is associated to the device on which the SIM operates. Typically, this additional identifier is the IMEI number. It is recalled that IMEI means International Mobile Equipment Identity and is a number, usually unique to identify GSM, WCDMA, and iDEN wireless devices. It is usually found printed inside the wireless device, on the battery compartment for instance.

Preferably, the IMEI are provided by ranges in the various UDRs. According to a preferred embodiment, the device identifiers are Type Allocation Code usually referred to as TAC. It is recalled that the Type Allocation Code (TAC) is the initial eight-digit portion of the 15-digit IMEI code used to uniquely identify wireless devices.

A type of profile can be assigned to an IMSI or range of IMSI or to an IMEI or to a range of IMEI or to a TAC or to a range of TAC, which significantly facilitates the pre-provisioning stage.

Attachment and Authentication:

When a roaming wireless device tries to attach to a visited network (see step 101) that implements the present invention, the visited network determines whether the message is received from a wireless device having an identifier that matches at least an identifier (IMSI for instance) or a range of identifiers (range of IMSI) handled by the V-MLR.

More precisely a routing equipment of the routing means, such as a V-MSC/V-VLR, determines that the identifier of the wireless device has been previously provisioned and builds the destination address by adding the identifier of the originator, typically the IMSI of the wireless device. Then, a router (STP) determines the destination address of the message through finding the address of the V-MLR based on the V-MLR address provisioned during the pre-provisioning phase and based on the IMSI. The message can therefore be routed to the V-MLR (see step 102). More precisely, in response to the attach request message from the wireless device, the V-MSC/V-VLR sends to the V-MLR an authentication request message. This authentication request comprises the identifier (IMSI). This is done in Signaling System 7 by a MAP-Send-Authentication-Info communication 1 with the universal single identifier IMSI as a parameter.

Thus the attachment request is kept in the visited network and is not routed to a home location register of the home network as it would have been the case according to the prior art.

Then, the V-MLR retrieves the address of the H-MLR based on the IMSI of the wireless device (see step 103). This is done using the address of the H-MLR that has been previously provisioned in the V-MLR. Then the V-MLR changes the address of the message that is used for its routing. Typically, the V-MLR changes the Global Title (GT) address of the attachment request message to be able to forward the message to the H-MLR.

According to an alternative embodiment, the V-MLR can also send directly the message to an international gateway that will route the message to the H-MLR according to the Global Title value. This message is typically a MAP send authentication information. In this embodiment, the Global Title of the message is not modified.

Thus the message can be routed from the V-MLR to the H-MLR (see step 105). Typically, this message is a request for authentication vectors (MAP send-authentication-information (IMSI)).

According to an embodiment, this message is routed to an international gateway. A private SS7 network can also be use between visited and home network.

According to an embodiment, the H-MLR comprises an Authentication Center (AuC), or at least exhibits the same functionalities as an AuC. Upon reception of the message, the H-MLR performs the generation of authentication set of vectors. Alternatively, the H-MLR does not comprise an AuC, but is configured to, upon reception of the message from the V-MLR, forward the message to an AuC located in the home network. Once the authentication vector generation is completed, the H-MLR sends back the response to the V-MSC (see step 106).

The generation of authentication set of vectors is preferably performed by the AuC embodied in the H-MLR according to conventional techniques of the prior art.

Thus the invention allows processing the authentication vectors by the authentication module of the home network. Therefore sensitive data such as subscriber authentication keys, typically referred as Ki, can be kept in the home network. The invention thus complies with the security requirements of the countries that do not allow storing these sensitive data out of the subscriber's home country. According to the advantageous embodiment where the AuC is embed in the MLR, the sensitive data are kept in the H-MLR when the wireless device is roaming.

The V-MLR also marks the wireless device as a roaming wireless device in its V-UDC (see step 104). This step can be performed before step 5 or after step 6.

The H-MLR also marks the wireless device as a roaming wireless device in its H-UDC with the country and/or the operator of the visited network.

V-VLR Provisioning—Update Location:

As it will be described below with further details, for the update of the data regarding the location of the wireless device, the V-VLR delivers update location message to the V-MLR without sending update location message to the home network, avoiding thereby using international gateways. Additional messages for checks and for acknowledgment are also exchanged between the V-MSC/V-VLR and the V-MLR without involving the home network.

These steps are described below with more details with reference to FIG. 3.

First, the wireless device and the V-MSC/V-VLR exchange authentication and cyphering request and response (see step 107) and then identity requests and response (see step 108). Preferably, these steps are conventional steps performed according to the prior art, typically according to the Signaling System 7, SS7 protocol.

In case the device is determined to be a provisioned device, and once authentication is successfully completed, the V-VLR sends an Update Location (UL) message to the V-MLR (see step 109). This is typically done through a MAP-Update-Location message.

This messages MAP-Update-Location message from the V-MSC/V-VLR to the V-MLR is routed based on the IMSI contained in this message and based on the address of the V-MLR previously provisioned in the routing means. More precisely, the IMSI first allows the routing means of the visited network to determine whether the device is a provisioned device (the device is determined to be a provisioned device if the IMSI of the device is provisioned in the routing means of the visited network). If the device is determined to be a provisioned device, the IMSI also enables the routing means to determine the address of the V-MLR that is assigned to the IMSI and that was previously provisioned. In case the routing means of the visited network determine that the device is not a provisioned device, then the authentication request is routed to the home network MLR based on the IMSI.

The message for update location comprises an association of at least two identifiers, such as the IMSI and the International Mobile Equipment Identity (IMEI) of the wireless device. If the IMEI is not provided by the wireless device and is therefore not known by the V-MSC when receiving the message, then the V-MSC can request the IMEI from the wireless device. This is typically done using a Mobility Management Identity Request message. V-MLR can also use Remote File Management command to request this IMEI to the wireless device.

The V-MLR checks whether said association matches an association of at least two wireless device identifiers that has been previously provisioned and stored in the V-UDR during the pre-provisioning phase. The V-MLR retrieves from the V-UDR the profile data based on the wireless device identifiers only if the couple of identifiers sent with the message for update location matches the couple of identifiers stored in the V-UDR (see step 110). This optional step allows a significant enhancement of the security.

The V-MLR then provisions the V-MSC by using the profile associated with the identifier in the V-UDR (see step 111). This provisioning is typically done through a MAP insert-subscriber-data message. In an embodiment where the V-UDR is provisioned with ranges of IMSI, then the V-MLR retrieves from the V-UDR the profile associated to the range of IMSI corresponding to the IMSI sent from the V-VLR.

The profile comprises subscriber's data such as category, subscriber status, MO-SMS, MT-SMS, GPRS subscription are transmitted to the V-VLR. The subscriber's data allow determining whether the update location must be successfully completed and/or whether the attachment must be accepted or denied.

In response, the V-MSC/V-VLR sends to the V-MLR an acknowledgment of subscriber data insertion. This is typically done through a MAP-insert-subscriber-data-acknowledgment message (see step 112).

Then the V-MLR sends to the V-MSC/V-VLR an acknowledgment of update location. This is typically done through a MAP-Update-Location-acknowledgment message (see step 113).

Finally, if the previous steps have been successfully conducted, the V-MSC/V-VLR sends to the wireless device a message for accepting the attachment (see step 114).

Therefore, it appears clearly that the invention allows performing the update of the location of the wireless device through using resources of the visited network only. Resources of the home network and international gateways are not used.

Thus, the invention allows performing preferably both the attachment/authentication and the update of the location of the wireless device through using resources of the visited network only. As above explained, once the routing means (STP, V-MSC/VLR, V-SGSN) of the visited network have determined, based on the identifier of the device, that the device is a provisioned device and the address of the V-MLR assigned to the device, then these routing means send an authentication request message (MAP send authentication information) if the message received from the provisioned wireless device is a request for attachment (attach request) or send an update location message (MAP update location) if the message received from the provisioned wireless device is a response to an identity request of a phase of update location of the wireless device.

Message Transmission:

In this non limitative exemplary embodiment, the message that contains a content, is called a content message and is typically an SMS type message or a USSD type message.

According to the prior art, when the V-MSC/V-VLR receives the message, it forwards it to a H-SMSC located in the home network. The present invention allows sending the message to an SMSC of the visited network, avoiding thereby using automatically international gateway and non-local resources. As described above, according to an advantageous embodiment of the invention, the SMSC is embedded in the MLR.

These steps are described below with more details with reference to FIG. 4. The wireless device sends the content message, such as a SMS containing measures for instance, to the V-MSC/V-VLR (see step 115). The content message contains the address of a V-SMSC. This is achieved through provisioning, at a previous step, the address of a V-SMSC in the wireless device. More precisely, a chip embedded in the wireless device, such as a subscriber identification module (SIM), is provisioned with the address of a V-SMSC. As described previously, all SMSCs of the networks wherein the present invention can be implemented have a common address. When the V-MSC/V-VLR reads this common address it automatically forwards the message to SMSC of the visited network (see step 116).

The V-SMSC then stores the message in the V-UDR (see step 117). The embodiment where the V-SMSC is embedded in the V-MLR is also very advantageous for that step.

The data are stored in V-UDR and are made accessible from the home network. The V-SMSC sends to the V-MSC/V-VLR an acknowledgment of reception of the content message (see step 118). This acknowledgment is typically a MO-forward-short-message-acknowledgment message.

A M2M application of the home network can then retrieve or read these data from the H-UDR using the resources of the home network (see step 119). M2M applications can subscribe to be notified when modification are done on data concerning the wireless module. According to another embodiment, the data are directly retrieved or read from the V-UDR by an M2M application located outside the Visited network. The M2M application can then process these data.

Preferably, data are retrieved from the V-UDR and read or send to the home network through a private network.

According to an embodiment that is not illustrated on the drawings, the M2M application (H-M2MA), possibly through a gateway (H-M2MGW) associated to this M2M application and that interfaces the M2MA, connects to the H-UDR to read the data stored in the V-UDR. Thus, the M2MA uses the network between the UDRs to read data that are remotely stored.

The M2M application associated with a H-M2MGW preferably form a platform. This platform is referred to as a Machine to Machine Service Platform (MSP).

Therefore, it appears clearly that the invention allows storing the content data through using resources of the visited network only. In addition, in case a private network is used between the V-MLR and the H-MLR, resources of the home network and international gateways are not used.

Traffic Consolidation/Billing:

All traffic data for the wireless device roaming in the visited network is stored in a repository of the V-MLR such as the V-UDR. These traffic data are thus available to the home network, as described above regarding the content message.

At periodical intervals, the H-M2MA or a H-M2MGW or a MSP located in the home network checks if the wireless device has been marked as roamer by the H-MLR.

If yes, then it collects in the UDR all traffic information. More precisely, the part of the traffic information that relates that to the traffic in the visited network was previously stored in the V-UDR. Then the H-M2MGW (or M2MA or MSP) sends a record related to charging such as a Charging Data Record (CDR) to a module in charge of the billing (BSS) for further charging and/or billing.

Therefore the billing information is kept private in the home network.

According to a non limitative embodiment, the User Data Repository (UDR) comprises at least some of the following data:

IMSI. This is the main key to access data record:
roaming device indicator allowing exhaustive CDR generation
visited network identifier
IMSI-IMEI: association couple or TAC list
real IMEI after first association
MSISDN allocated from pool: the use and functions of the MSISDN allocated from pool are detailed in the section below that further describes how the MLR operates with reference to FIGS. 8 to 15.
IP address for 3G network
device profile—traffic, attachment, schedule, etc. . . .
traffic statistics
charging information
data stored in tree (ETSI model)

As indicated previously, the invention is not limited to transmission of SMS type messages but encompasses other type of messages. For instance, the invention encompasses transmission of IP packets based on GPRS.

FIGS. 5 to 7 provide exemplary use cases of exchanges for a transmission of IP packets with the invention.

All the features and the steps that are described above applies for a use case where the message is data, for instance on GPRS. The skilled person in this field will make the necessary adaptations for applying the teaching of the above description related to SMS to the use case related to IP packets.

For instance the V-MSC and H-MSC are replaced by V-SGSN and H-SGSN, and the V-SMSC and H-SMSC are replaced by V-GGSN and H-GGSN.

Else, the addresses of the SMSCs are replaced by APN for the references of the GGSNs and a common APN is provided for all GGSNs of the networks that implement the solution of the present invention.

Additionally, during the phase dedicated to update location, it is the V-SGSN which sends the message for update location, said message being typically a MAP-update-location-for-gprs.

In addition, during the phase dedicated to transmission of the content message, the data being on GPRS, then the V-SGSN contacts the V-GGSN thanks to the pre-provisioning of DNS and the APN provided by the V-MLR during the phase dedicated to update location.

Else V-GGSN sends the data of the content message to the local M2MGW.

According to the non limitative embodiment described above, the invention comprises a single data repository for storing: signaling data regarding the wireless device such as identifiers and profile data; content message comprising for instance measurements performed by the wireless device; data related to any one of traffic, billing and charging.

The present invention also encompasses embodiments wherein these data are stored in a plurality of data repositories. For instance, there may be a repository (V-UDR) for storing signaling data and a different repository (V-CDR) for storing content data. Of course, both V-UDR and V-CDR are located in the visited network and are connected to the V-MLR or form part of the V-MLR.

Additional details regarding the MLR and how it operates will be provided below with reference to FIGS. 8 to 15. In this section, the MLR will be described in a situation where the wireless device is not roaming. Many of the features that are described in the section dedicated to the MLR are only optional and do not limit the scope of the present invention. It should also be noticed, that all the features and steps described in the section below dedicated to the MLR can be combined and associated with any features and steps described in the above sections of the description and in particular in the sections that refers to FIGS. 1 to 7. In addition, the description below is applicable to any MLR whatever is the network where it is located. Thus, the description below applies to V-MLR and H-MLR.

It must be noticed that while the exemplary embodiment below relates to transmission of SMS type messages or USSD type messages, the invention encompasses MLR that support the communication of IP packets with data.

The description below is taken up from the European patent application No. 11306123.8 filed on 9 Sep. 2011 by the present applicant. This previously filed patent application is herein incorporated by reference.

Before detailing the features and advantages of the MLR (either V-MLR or H-MLR), the technique according to the prior art is briefly exposed.

FIG. 8 shows a partial illustrative view of a communication network according to the prior art. This communication network comprising a cellular communication radio network, some data exchanges occur between on one hand at least one wireless device and on the other hand a machine to machine application M2MA. A wireless device is able to collect at least one measure, for example periodically. The machine to machine application M2MA is able to centrally gather said measures collected by said at least one wireless device and to exploit said measures. For that purpose, a communication network is used which comprises at least one cellular communication network.

A wireless device is able to connect to said cellular communication network. For this purpose it comprises treatment and communication means adapted to said function. In the following example, the wireless device MMT is a measuring mobile terminal (MMT) typically comprises means for wireless communication and a SIM card recognised by said cellular communication network. Each SIM card is uniquely associated to an IMSI (International Mobile Subscriber Identity) number and it is not provided—at the moment of the purchase of the wireless device MMT—of an associated MSISDN number (Mobile Station Integrated Services Digital Network Number), which can change in time.

The wireless device is permanently identified by a universal single identifier IMSI, associated to said SIM card.

According to prior art, a wireless device connects to a wireless cellular network by establishing a connection with a mobile switching center MSC/visitor location register VLR; both those entities are known to be grouped into a single physical entity. The selected MSC can be located anywhere in the network. The base station BSC is near the wireless device which controls a set of BTS.

In detail the base transceiver station, or BTS, contains the transceivers, antennas, and subsystems for encrypting and decrypting communications with the base station controller (BSC). Typically a BTS for anything other than a picocell will have several transceivers serving several different frequencies.

A BTS is controlled by a parent BSC that acts as a concentrator; in fact, a plurality of different low capacity connections to BTSs (with relatively low utilisation) become reduced to a smaller number of connections towards the mobile switching center (MSC) (with a high level of utilisation). Overall, this means that networks are often structured to have several BSCs distributed into the areas surrounding their BTSs which are in turn connected to large centralised MSC sites.

The link between the wireless device and the mobile switching center MSC/visitor location register VLR is typically and at least in part wireless, especially within the wireless device and a base transceiver station BTS to which the mobile switching ing center MSC/visitor location register VLR is connected. The links between the mobile switching center MSC/visitor location register VLR and the other elements of the cellular communication network or of the communication network are typically established by wire, using a known infrastructure of the cellular communication network today used.

According to prior art, such a connection between a wireless device and the cellular communication network is established once at the application running on the wireless device start. This connection then remains permanent during the whole measuring campaign, uselessly blocking resources of the cellular communication network.

Once connected to the cellular communication network, a wireless device can, according to its configuration, transmit to the machine to machine application M2MA either each measure or a plurality of measures collected, e.g. by means of a data message coding said measure or collection of measures. To do that, it uses a message protocol supported by the cellular communication network, such as SMS, USSD, or other equivalent. The message comprising said measure is transmitted through the network and directly addressed toward the machine to machine application M2MA or indirectly to a machine to machine application gateway M2MGW which then transmits it to the machine to machine application M2MA. In both cases, the destination address M2MA@ is known from the wireless device.

In return, the machine to machine application M2MA can address back a message to the wireless device; therefore it is necessary to be able to address said wireless device. The elements of the cellular communication network that are necessary to link a machine to machine application M2MA and a wireless device comprise at least the ones that follow.

A wireless device can connect through any of the mobile switching centers MSC/visitor location register VLR, initially unknown. Moreover, the wireless device can be mobile. This means that it can change from one mobile switching center MSC/visitor location register VLR to another, as a function of the cell nearest from its location or best signal reception. So, when a wireless device connects to the cellular communication network through a mobile switching center MSC/visitor location register VLR, or roams toward a new mobile switching center MSC/visitor location register VLR, said mobile switching center MSC/visitor location register VLR informs the cellular communication network of the new location of said wireless device. One element of the cellular communication network, named home location register HLR is in charge of maintaining said location up to date on a lookup table and keeps for each wireless device for which it is in charge, the last known location, in the form of an address MSC@ of the mobile switching center MSC/visitor location register VLR, through which said wireless device is connected to the network. Said home location register HLR is also a server, able to provide on demand, for a given wireless device, said address MSC@ from said table.

Whenever a network element wishes to send a message to a wireless device, it uses a short message service center SMSC. Said short message service center SMSC is a server able to retransmit said message to the wireless device. Said element then sends to said short message service center SMSC, said message along with an identifier allowing to uniquely identifying said wireless device. Said identifier is typically the public subscriber phone number MSISDN of the wireless device.

In order to locate the wireless device, the short message service center SMSC send a request to the home location register HLR indicating said public subscriber phone number MSISDN. The home location register HLR, answers back by indicating the mobile switching center MSC/visitor location register VLR address associated to the wireless device. It can be noted here that according to prior art, each wireless device is associated to a permanent public subscriber phone number MSISDN.

Given this location (MSC address) and identification (MSISDN) information, the short message service center SMSC is able to transmit the message to said mobile switching center MSC, comprising the MSISDN identifier. Said mobile switching center MSC/visitor location register VLR, thanks to the MSISDN identifier, can find and identify the wireless device and send to it said message.

Another element is an authentication center AuC. Such an element is able to authenticate a given wireless device. The authentication process occurs at the connection of the wireless device.

Another optional element can also be present in order to allow a machine to machine communication: a machine to machine gateway M2MGW able to interface between the cellular communication network and the machine to machine application M2MA. Such a machine to machine gateway M2MGW is e.g. useful when the machine to machine application M2MA is located is the communication network, but outside of the cellular communication network. In that case, said machine to machine gateway M2MGW acts as a gateway between the cellular communication network and its elements (HLR, MSC, SMSC, AuC, etc.) and the machine to machine application M2MA. So, if the machine to machine application M2MA is located over the Internet network, the application gateway M2MGW comprises the means necessary to translate, to adapt the formats, to relay and redirect the data exchanges between the machine to machine application M2MA and any cellular communication network element, in both directions.

As illustrated in FIG. 9, in order to manage the wireless devices of a machine to machine application M2MA, a single module, named MLR, is therefore created. The MLR which preferably gathers the functions of at least these three/four elements: home location register HLR, short message service center SMSC, authentication center AuC and, when present, machine to machine application gateway M2MGW. The previous list of elements has to be intended as not exhaustive, in the sense that many other components can be included into the module MLR. It shall be noted that the traditional HLR is not embedded in the MLR. It still exists in the operator's network. The module MLR embeds a new home location register HLR that is dedicated for the but which keeps the functions of the traditional home location register HLR. Some modifications will be introduced in the HLR embedded in the MLR such as a function to manage the MSIDSN allocation for example.

This is obtained in the form of a new module MLR (Mobile Location Register), that replaces, for what concerns the wireless devices, the preferably three or four previously indicated elements HLR, SMSC, AuC and M2MGW into a same physical structure. It is therefore clear that all the functions previously supported by each of the previous elements HLR, SMSC, AuC and M2MGW, are performed by the module MLR. Said module MLR is inserted in the cellular communication network by configuration of said network by replacing the addresses of the elements HLR, SMSC, AuC, M2MGW, by the address of module MLR, in translating address tables (e.g. Global Title tables in a Signaling System 7), for all the concerned wireless devices. The concerned wireless devices are here the wireless devices related to a machine to machine application M2 MA.

The cellular communication network still comprises some home location registers HLR, some short message service center SMSC, some authentication center AuC, that remain unaffected, in order to manage the other mobile terminals, not related to a machine to machine application, such as mobile phones.

Such a gathering of preferably said three or four elements in one single module MLR implies that these elements belong to a same software executing over one single physical data processing unit or computer. Such a gathering is advantageous because it simplifies, shortens or even avoids some data exchanges between elements described in the prior art. This advantageously allows a simplification of installation, maintenance, management of entities related to a machine to machine application M2MA. So, e.g., the creation or the correction of a wireless device profile can be done using only one single entity, the module MLR, which can then manages a single database BDD for all the associated wireless devices. As well all the HLR, SMSC, AuC, M2MGW subsystems can be adapted to a specific exigency of a user even if maintaining their traditional function.

The short message service center SMSC can be a service center for message of any type, available in the cellular communication network. It can thus be a message service center for SMS type messages, or else a message service center for USSD type messages, or any other equivalent message service center. According to an embodiment, the module MLR includes functions of a single message service center among all possible ones. Alternately the module MLR includes functions of several message service centers, so as to allow sending of different types of message.

The invention introduces several features in order to optimize the communication network resources use and particularly to drastically reduce the number of public subscriber phone numbers MSISDN needed to manage and to address a great number of wireless devices.

According to prior art, a connection between a wireless device and the cellular communication network is established once at application start. On the contrary, the method that involves the MLR plans a connection for each sending of a measure or collection of measures. By doing so, in a typical measuring application, such as a telemetry application, a wireless device performs one measure, once per period, e.g. once per hour, and send said measure through the communication network. The sending of a message comprising the measure only takes a few seconds. It is then useless to maintain a stable or static connection to the communication network which needlessly network resources when data have been sent.

A method according to the invention thus advantageously comprises, to link a machine to machine application M2MA with at least one wireless device, the followings steps. The wireless device, after the measure or the collection of measures have been collected and are ready to be sent, connects to the cellular communication network, and in detail by means of a base transceiver station BTS in turn connected as known with a base station controller BSC, to mobile switching center MSC/visitor location register VLR, typically the one which is closer to the mobile switching wireless device or provides better radio signal conditions. The mobile switching center MSC/visitor location register VLR remains unaltered. Once the connection is established, the wireless device sends said measure or collection of measures, through the communication network, towards the machine to machine application M2MA. The communication network carries the message towards its destination. Once said sending is done, and advantageously if the next measure or a plurality of measures is delayed in time, the wireless device frees the network resources by disconnecting from the communication network, until the next scheduled new measure or a plurality of measures. The disconnection therefore frees the radio channel previously occupied for measured data transmission also from network control data exchanged to/from the wireless device.

In current machine to machine environments, a measure is typically sent as soon as possible. Most often, the wireless devices are not configured or are configured by default when it comes to the time of measure acquisition, the time of measure sending or the time of connecting to the network. Therefore it is possible to arrange a predetermined and modifiable data exchange timetable. A measure can then be collected at an undefined time or at a predetermined time common to all the wireless devices. It can follow from such an arrangement that all the measures, collected according to e.g. a one hour period, are collected either by default or by configuration at the same time, e.g. the round hour. It then follows a simultaneous sending from all wireless devices, which may be numerous, of measuring messages, potentially leading to an overflow of the cellular communication network. This is as much prejudicial as no other message is sent during the remainder of the period/hour.

According to an advantageous feature of the method, either the sending time of a measure, or preferentially the connection time of a wireless device can be configured. So, especially when the data inherent to a measure are long and do not need to be updated very often, it is possible to define the time at which the wireless device connects and thus the time when the measure is sent. This may imply a delay between the measurement time and the sending time of the measure. The measurement time can be let unchanged or can be independently configured. Some wireless devices may then connects and sends their measure e.g. at the round hour more 5 min, others e.g. at the round hour more 10 min, and so on by spreading the sending over the period. By doing so, the transmitting load of the cellular communication network can be shared in time in order to avoid the overflow by spreading it over time. Such a configuration of wireless devices can be defined in a wireless device profile stored in a database maintained by module MLR or can be defined on a message basis, e.g. when the machine to machine application M2MA sends a message or a response. Therefore this feature allows to a time division on multiple access (TDMA) of the meaning mobile terminals (MMT).

It has been previously seen that, according to prior art, a mobile terminal is addressed, in a cellular communication network, e.g. for sending to it a message, by a public subscriber phone number MSISDN. Such numbers are available but in limited quantities. In the case of a wireless device, associated to a machine to machine application M2MA, the invention exhibits several methods to avoid an allocation of a permanent public subscriber phone number MSISDN to each wireless device.

According to a first embodiment, capable of reducing the size of the naming space, a public subscriber phone number MSISDN is allocated only temporarily to a wireless device and therefore to the corresponding associated SIM card, for a duration limited to its actual connection to the cellular communication network reuse some public subscriber phone numbers MSISDN, from a wireless device to another one, which are not simultaneously connected to the network. At a given time, a public subscriber phone number MSISDN is uniquely allocated to at most one wireless device. The allocation management is performed by the module MLR.

The allocation of a public subscriber phone number MSISDN to a wireless device can be done systematically during each connection to the network, since it is a temporary allocation.

According to an alternate embodiment, allowing to further drastically reduce the naming space, each wireless device, associated to a given machine to machine application M2MA, is allocated by means of a private device identifier PDID. Said private device identifier PDID is not a public identifier and is not a public subscriber phone number MSISDN. Said private device identifier PDID is a private identifier in that it is managed by the module MLR. So, the module MLR permanently maintains the database BDD updated, and therefore updates the look-up table associating for each wireless device, its universal single identifier IMSI and its private device identifier PDID. Said private device identifier PDID is defined only in the perimeter of the machine to machine application M2MA and is used inside this perimeter to identify a wireless device, e.g. to send a message to it from a machine to machine application M2MA. This use is more deeply detailed with reference to flow diagrams of FIGS. 10-15.

At a given time, a private device identifier PDID is uniquely allocated to at most one wireless device. Such an allocation of a private device identifier PDID can be permanent for a given wireless device. By doing so, this private device identifier PDID is left unchanged from a connection/disconnection of said wireless device to/from the cellular communication network. The wireless device keeps its private device identifier PDID, even when it is disconnected and unseen from the communication network. This necessitates a naming space of which size is equal to the number of wireless devices in said perimeter.

The allocation of a private device identifier PDID to a wireless device can be done e.g. during its first connection to the network, since it is a permanent allocation. Alternately a private device identifier PDID can be allocated to a wireless device in a global configuration step, e.g. by mean of a database or look up table e.g. managed by the module MLR and comprising for each wireless device, its universal single identifier IMSI and its private device identifier PDID.

Now, we are going to describe, with reference to FIGS. 10-15, the embodiments of the invention, comparatively to prior art, for three operations: a connection of a wireless device to the network, the sending of a message FROM a wireless device, and the sending of a message TOWARD a wireless device.

FIG. 10 shows a flow diagram corresponding to a connection according to prior art, while FIG. 11 shows a flow diagram corresponding to a connection according to the invention.

With reference to FIG. 10, according to prior art, following the connection of a wireless device with a mobile switching center MSC/visitor location register VLR, said mobile switching center MSC/visitor location register VLR knows the universal single identifier IMSI of the wireless device. It then sends an authentication request 1 of the wireless device based on said universal single identifier IMSI. Said request 1 is sent to a network element AuC in charge of authentication. This is done in Signaling System 7 by a MAP-Send-Authentication-Info communication 1 with the universal single identifier IMSI as a parameter. Said authentication element AuC answers to the mobile switching center MSC/visitor location register VLR with a communication 2 with some identification information as parameter. In Signaling System 7 this is done by a MAP-Send-Authentication-Info-response communication 2.

The mobile switching center MSC then informs 3 the home location register HLR of the new location (and of the apparition in the cellular communication network) of the wireless device, still identified by its universal single identifier IMSI. This is done in Signaling System 7 by a MAP-Update-Location communication 3 with the universal single identifier IMSI as parameter. Then the home location register HLR provides 4 to the mobile switching center MSC/visitor location register VLR some information concerning the wireless device. Said information comprise the public subscriber phone number MSISDN of the wireless device, and other profile parameters. This is done in Signaling System 7 by a MAP-Insert-Subscriber-Data communication 4 with the public subscriber phone number MSISDN of the wireless device and other profile data as parameters. The mobile switching center MSC/visitor location register VLR acknowledges receipt and sends back to the home location register HLR a receipt acknowledgment 5. This is done in Signaling System 7 by a MAP-Insert-Subscriber-Data-response communication 5. The home location register HLR acknowledges receipt and sends back in return to the mobile switching center MSC a communication 6. This is done, in Signaling System 7, by a MAP-Update-Location-response communication 6.

With reference to FIG. 11, according to the invention, following the connection of a wireless device with a mobile switching center MSC/visitor location register VLR, said mobile switching center MSC knows the universal single identifier IMSI of the wireless device. It then sends an authentication request 21 of the wireless device based on said universal single identifier IMSI. Said request 21 is sent to the network element in charge of authentication, that is, to the module MLR, since said module MLR acts according to the invention, for the wireless devices, as the former authentication module AuC. This is done in Signaling System 7 by a MAP-Send-Authentication-Info communication 21 with the universal single identifier IMSI as parameter. Said module MLR answers to the mobile switching center MSC by a communication 22 with identification information as parameter. In Signaling System 7 this is done by a MAP-Send-Authentication-Info-response communication 22. With respect to authentication, the module MLR acts exactly the same as the former AuC module.

The mobile switching center MSC then informs 23 the module MLR, that replaces according to the invention the prior art home location register HLR for the management of the location of wireless devices, of the new location (and of the appearance in the cellular communication network) of the wireless device, still identified by its universal single identifier IMSI. This is done in Signaling System 7 by a MAP-Update-Location communication 23 with the universal single identifier IMSI as parameter. Then the module MLR provides 24 to the mobile switching center MSC some information concerning the wireless device. Said information comprise, depending on the embodiment, either the temporary public subscriber phone number MSISDN of the wireless device, and other profile parameters. This is done in Signaling System 7 by a MAP-Insert-Subscriber-Data 24 communication with the public subscriber phone number MSISDN, respectively the private device identifier PDID, of the wireless device and other profile data as parameters. The mobile switching center MSC/visitor location register VLR acknowledges receipt and sends back to the module MLR a receipt acknowledgment 25. This is done in Signaling System 7 by a MAP-Insert-Subscriber-Data-response 25 communication.

The module MLR acknowledges receipt and sends back to the mobile switching center MSC a receipt acknowledgement 26. This is done, in Signaling System 7, by a MAP-Update-Location-response communication 26.

FIG. 12 shows a flow diagram corresponding to the sending of a message from a wireless device, according to prior art, while FIG. 13 shows a flow diagram corresponding to the sending of a message from a wireless device, according to the invention.

With reference to FIG. 12, according to prior art, a mobile switching center MSC/visitor location register VLR receives from a wireless device a message to be retransmitted, to a machine to machine application M2MA by mean of a communication 7. In a machine to machine environment, such a message typically comprises at least one measure and is to be sent to a machine to machine application M2MA in charge of the gathering and treatment of the measures. The communication 7 comprises an address M2MA@ as parameter allowing finding of the machine to machine application M2MA or equivalently the short message service center SMSC. The mobile switching center MSC transmits said message to said short message service center SMSC in a communication 8. This is done in Signaling System 7 by a MAP-Forward-SM communication 8. The short message service center SMSC then in turn acknowledges receipt 9 to the mobile switching center MSC/visitor location register VLR. This is done in Signaling System 7 by a MAP-MO-forward-SM-response 9.

The short message service center SMSC translates or eventually adapts the message and transmits 10 it to the machine to machine application M2MA. This is done using e.g. the short message peer to peer protocol SMPP, by a Deliver-SM communication 10. In return, the machine to machine application M2MA acknowledges receipt 11 to the short message service center SMSC. This is done in SMPP by a Deliver-SM-response 11.

The public subscriber phone number MSISDN provided by the home location register HLR during the connection step, is here used to identify/sign the sender of the message, that is, the wireless device.

With reference to FIG. 13, according to the invention, a mobile switching center MSC receives from a wireless device a message to transmit, to a machine to machine application M2MA by mean of a communication 27. In a machine to machine environment, such a message typically comprises at least one measure and is to be sent to a machine to machine application M2MA in charge of the gathering and treatment of the measures. The communication 27 comprises an address M2MA@ as parameter allowing finding the machine to machine application M2MA or equivalently the module MLR which replaces here the short message service center SMSC. The mobile switching center MSC transmits said message to said module MLR in a communication 28. This is done in Signaling System 7 by a MAP-Forward-SM communication 28.

The module MLR then in turn acknowledges receipt 29 to the mobile switching center MSC. This is done in Signaling System 7 by a MAP-MO-Forward-SM-response 29.

The module MLR translates or eventually adapts the message and transmits 30 it to the machine to machine application M2MA. This is done in SMPP, by a Deliver-SM communication 30. In return, the machine to machine application M2MA acknowledges receipt 31 to the module MLR. This is done in SMPP by a Deliver-SM-response 31.

A wireless device knows by configuration the destination address M2MA@ allowing it to send a message to the machine to machine application M2MA to which it is attached.

According to the previously described embodiments, a wireless device may be identified either by a temporary public subscriber phone number MSISDN, or by a private device identifier PDID. Either said temporary public subscriber phone number MSISDN or said private device identifier PDID are provided by the module MLR during the connection step, and is used here to identify/sign the sender as the originator of the message, that is, the wireless device.

FIG. 14 shows the flow diagram corresponding to the sending of a message toward a wireless device, according to prior art, while FIG. 15 shows the flow diagram corresponding to the sending of a message toward a wireless device, according to the invention.

With reference to FIG. 14, according to prior art, a message to a measuring module terminal is sent by its sender to the short message service center SMSC by means of a communication 12. In a machine to machine environment said sender is typically a machine to machine application M2MA. Such a machine to machine application M2MA typically uses such a message to configure a wireless device by transmitting to it an order figuring, e.g. which measure to do, according to which period, etc. The targeted wireless device is identified for the short message service center SMSC, classically, by its public subscriber phone number MSISDN. Said public subscriber phone number MSISDN is transmitted as a parameter in the communication 12. This is done in Signaling System 7 by a Send-Msg communication 12 with the public subscriber phone number MSISDN as parameter. Said short message service center SMSC locates the wireless device by mean of a request 13 to the home location register HLR. In said request 13, the targeted wireless device is identified for said home location register HLR, classically, by its public subscriber phone number MSISDN. This is done in Signaling System 7 by a MAP-SRI-SM communication 13 with the public subscriber phone number MSISDN as parameter. The Home Location Register HLR answers by a communication 14. An address MSC@ of the mobile switching center MSC/visitor location register VLR managing the wireless device is returned back as parameter of said communication 14. This is done in Signaling System 7 by a MAP-SRI-SM-response communication 14 with the address MSC@ of the mobile switching center MSC/visitor location register VLR as parameter. Given said address MSC@, the short message service center SMSC can transmit the message by mean of a communication 15 addressed to said mobile switching center MSC/visitor location register VLR. This is done in Signaling System 7 by a MAP-MT-Forward-SM communication 15 with the public subscriber phone number MSISDN as parameter. So, the mobile switching center MSC/visitor location register VLR receives the message, identifies the wireless device destination by mean of its public subscriber phone number MSISDN and can then transmit to it said message. The mobile switching center MSC acknowledges receipt to the short message service center SMSC by a receipt acknowledgement 16. This is done in Signaling System 7 by a MAP-MT-Forward-SM-Response communication 16.

With reference to FIG. 15, according to the invention, a message to a measuring module terminal is sent by its sender to the module MLR, here replacing a short message service center SMSC, by mean of a communication 32. The targeted wireless device is identified for said module MLR, according to the invention, by its private device identifier PDID. Said private device identifier PDID is transmitted as a parameter of communication 32. This is done in SMPP by a Submit-SM communication 32 with the private device identifier PDID as parameter. Said module MLR search for the public subscriber phone number MSISDN allocated to the wireless device by mean of a request 33 to a database BDD internal to the module MLR. In said request 33, the concerned wireless device is identified, according to the invention, by its private device identifier PDID. Alternately, in said request 33, the concerned wireless device may be identified by its universal single identifier IMSI, depending on the database organisation. Said database BDD permanently maintains up to date the location of the wireless devices in function of the location communications 23 sent by the mobile switching centers MSC/visitor location register VLR to the module MLR. In said database BDD, each wireless device is identified by its universal single identifier IMSI and/or its private device identifier PDID, and its location is stored by the address MSC@ of the mobile switching center MSC through which the wireless device is connected to the communication network. The database BDD permanently maintains, for each wireless device, a look up table between its universal single identifier IMSI and its private device identifier PDID. The database BDD may be requested to provide a universal single identifier IMSI in function of a private device identifier PDID, or reciprocally, a private device identifier PDID in function of a universal single identifier IMSI. The database BDD answers back by a communication 34. The address MSC@ of the mobile switching center MSC/visitor location register VLR managing the wireless device and the IMSI associated to the wireless device MTT are returned back as parameters of said communication 34. Given said address MSC@, the module MLR can transmit the message by mean of a communication 35 addressed to said mobile switching center MSC. This is done in Signaling System 7 by a MAP-MT-Forward-SM communication 35 with said IMSI as parameter. So, the mobile switching center MSC receives the message, identifies the wireless device destination by mean of its universal single identifier IMSI and can then transmit to it said message. The mobile switching center MSC acknowledges receipt to the module MLR by a receipt acknowledgement 36. This is done in Signaling System 7 by a MAP-MT-Forward-SM-Response communication 36.

The module MLR thus constitutes a comprehensive module also capable of keeping the correspondence between the private device identifier PDID of the wireless device, its IMSI and the temporary MSISDN while the terminal is connected to the cellular network.

Another problem occurring in a machine to machine environment is the billing of the communications. A cellular communication network classically uses a billing paradigm where a call data record CDR is built on the basis of a single call. Contrarily to a phone call, transmitting a large data volume over a medium of long duration, continuously and singularly, a wireless device typically transmits a small data volume, e.g. a single measure, over a very short duration, but repeats periodically the sending operation over a maybe very high plurality of times. The use of such a call and/or duration based paradigm, would lead, if applied to a machine to machine environment, to building and sending of too many call data records CDR, each corresponding to a very small billing volume, thus leading to a billing management inefficiency that furthermore increases with the number of wireless devices actually operating. For this reason a call and/or duration based billing paradigm appears to be inadequate to a machine to machine environment.

In order to solve this problem, the method according to the invention proposes to not send a call data record CDR for each message sent or received. On the contrary, according to the invention, the exchanged messages are advantageously gathered/grouped and a single call data record CDR is built and sent for said group. This can be done e.g. by the module MLR which benefits from a central vision of the machine to machine environment.

The gathering of messages can be scheduled in order to be performed from time to time. In that case, the messages sent and/or received by a wireless device are grouped over a given configurable duration of time.

The gathering of the messages can also be done spatially. In that case the messages sent and/or received by a set of wireless devices, said set being configurable, are grouped. It is thus possible to gather in a same single call data record CDR, e.g. all the wireless devices associated to a same machine to machine application M2MA.

It is also possible to combine the spatial and the temporal gathering approaches. All these approaches aim at decreasing the number of call data records sent up to a reasonable number.

It is also possible to condition the sending of a call data record CDR to a given volume of transmitted messages or equivalently to a given billing amount.

In summary, it is disclosed above a cellular communication network system that comprises at least one machine to machine application (M2MA) configured to receive and respectively transmit a message from and to the mobile switching center (MSC)/visitor location register (VLR), and that comprises at least one module (MLR) comprising: a home location register (HLR) configured to provide on demand, for a given wireless device (MMT), an address of the mobile switching center (MSC)/visitor location register (VLR) through which the wireless device (MMT) is connected to the cellular communication network; an authentication center (AuC) authenticating a given wireless device (MMT); at least one short message service center (SMSC) configured to transmit the message towards a wireless device (MMT); an application gateway (M2MGW) interfaced between the cellular communication network and the machine to machine application (M2MA).

According to another embodiment, it is disclosed a Module (MLR) connected through a communication network to at least a wireless device (MMT), at least a mobile switching center (MSC)/visitor location register (VLR) and at least a machine to machine application (M2MA), and that comprises: a home location register (HLR) configured to provide on demand, for a given wireless device (MMT), an address of the mobile switching center (MSC)/visitor location register (VLR) through which said wireless device (MMT) is connected to the cellular communication network; an authentication center (AuC) authenticating a given wireless device (MMT); at least one short message service center (SMSC) configured to transmit a message towards a wireless device (MMT); an application gateway (M2MGW) interfaced between the cellular communication network and said machine to machine application (M2MA); the home location register (HLR), the authentication center (AuC), the short message service center (SMSC) and the short message service center (SMSC) being embedded in a single physical structure forming at least in part the module (MLR).

According to another embodiment, it is disclosed a method of managing of a cellular communication network system, characterized in that:

a) it comprises the step of transmitting data between a machine to machine application (M2MA) and at least one wireless device (MMT) through a module (MLR); the module (MLR) comprising:

a home location register (HLR) sending on demand, for a given wireless device (MMT), an address of the mobile switching center (MSC) through which said wireless device (MMT) is connected to the cellular communication network, an authentication center (AuC) authenticating a given wireless device (MMT), at least one short message service center (SMSC) transmitting a message towards the wireless device (MMT), an application gateway (M2MGW) performing the step of interfacing the cellular communication network with said machine to machine application (M2MA)

b) it comprises the step of connecting the at least one wireless device (MMT) to the cellular communication network and disconnecting at least one wireless device (MMT) out of the cellular communication network upon the completion of data transmission.

In addition, the above description describes preferred and non limitative embodiments that incorporate the following features:

According to a preferred embodiment, the cellular communication network system comprises a module (MLR), at least one wireless device (MMT), said wireless device (MMT) comprises means to wireless transmit and receive data and is configured to receive and respectively transmit at least one message to and respectively from at least one mobile switching center (MSC)/visitor location register (VLR) and to the module (MLR).

According to a preferred embodiment the short message service center (SMSC) is a SMS message service center or a USSD message service center.

According to a preferred embodiment the wireless device is a measuring mobile terminal.

According to a preferred embodiment said module (MLR) comprises a single database (BDD) including data relating to a plurality of wireless devices (MMT) therein associated.

According to a preferred embodiment the cellular network communication system comprises the wireless device (MMT) that possesses a temporary public subscriber phone number.

According to a preferred embodiment the module (MLR) allocates a temporary public subscriber phone number to a wireless device, said temporary public subscriber phone number being a MSISDN number. Preferably, the module (MLR) allocates the temporary public subscriber phone number MSISDN number according to at least one criterion.

According to a preferred embodiment said module (MLR) comprises means to manage a plurality of private device identifier numbers (PDID); the private device identifier numbers (PDID) being private numbers not accessible to the public.

According to a preferred embodiment said private identifier number (PDID) is assigned to one single wireless device (MMT).

According to a preferred embodiment the means to manage the plurality of private device identifier numbers (PDID) comprise the database (BDD).

According to a preferred embodiment the step of temporary allocating a public subscriber phone number (MSISDN) for a wireless device (MMT) during its connection to the cellular communication network.

According to a preferred embodiment it is disclosed the step of allocating a private device identifier (PDID) number, to each wireless device mobile (MMT).

According to a preferred embodiment the allocation of the private device identifier (PDID) is permanent.

According to a preferred embodiment the method comprises a step of keeping correspondence between said private device identifier (PDID) and a universal single identifier (IMSI) of a wireless device (MMT).

According to a preferred embodiment the module (MLR) gathers billing call data record (CDR) for several connections of a same wireless device (MMT) or of a group of wireless devices (MMT), gathered based on duration or based on transmitted data volume.

According to a preferred embodiment said wireless device (MMT) connects to said module (MLR) according to a time division multiple access criterion.

According to a preferred embodiment at least part of the wireless devices (MMT) connect to said module (MLR) on a same time.

According to a preferred embodiment the module (MLR) keeps correspondence between said private device identifier (PDID), a temporary public subscriber phone number (MSISDN) and an international mobile subscriber identity number (IMSI) of said wireless device (MTT) while the wireless device (MTT) is connected to the network.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor, server, main frame computer, or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

The invention claimed is:

1. A method of providing a communication service for a wireless device registered in a home network and that is roaming in a visited network, the visited network comprising routing means (STP, V-MSC/VLR, V-SGSN), characterized in that the method comprises the following steps:

provisioning the routing means (STP, V-MSC/VLR, V-SGSN) of the visited network with a plurality of identifiers that identify a plurality of wireless devices that are registered in the home network, defining thereby in the visited network a plurality of provisioned wireless device;

provisioning the routing means (STP, V-MSC/VLR, V-SGSN) of the visited network with an address of a module (V-MLR) located in the visited network and comprising at least a home location register (V-HLR), and assigning the address of the module (V-MLR) to the plurality of identifiers provisioned in the routing means (STP, V-MSC/VLR, V-SGSN), so that the routing means (STP, V-MSC/VLR, V-SGSN) can access the address of the module (V-MLR) located in the visited network based on an identifier of the plurality of provisioned identifiers;

at the routing means (STP, V-MSC/VLR, V-SGSN) of the visited network:

receiving a message from a wireless device, the message comprising at least an identifier;

determining, based on said identifier, whether the message is received from a provisioned wireless device;

if the message is received from a provisioned wireless device, then determining, based on said identifier, the address of said module (V-MLR) that is assigned to the provisioned wireless device and then, based on this address, sending to said module (V-MLR) located in the visited network and comprising at least a home location register (V-HLR) at least one of:
- an authentication request message if the message received from the provisioned wireless device is a request for attachment;
- an update location message if the message received from the provisioned wireless device is a response to an identity request, the identity request being exchanged during a phase of update location of the wireless device.

2. The method according to claim 1, where the message received from the provisioned wireless device is a request for attachment, where the routing means (STP, V-MSC/VLR, V-SGSN) determines that the message is received from a provisioned wireless device and in response send an authentication request message to said module (V-MLR) located in the visited network, where said module (V-MLR) located in the visited network changes the recipient address of the authentication request message to indicate a module (H-MLR) located in the home network and comprising at least a home location register (H-HLR) for the home network, and routes the authentication request message to said module (H-MLR) located in the home network, where said module (H-MLR) located in the home network generates an authentication vector and sends the outcome of the authentication vector generation to the routing means (STP, V-MSC/VLR, V-SGSN) that received the message from the wireless device.

3. The method according to claim 1, where the method comprises provisioning at least one user data repository (V-UDR) located in the visited network with the plurality of identifiers and with profile data associated to the identifiers, the user data repository (V-UDR) being connected to the module (V-MLR) located in the visited network.

4. The method according to claim 3, comprising at least a phase of update location of the wireless device, where the phase of update location comprises the following steps:
- an end-to-end routing equipment (V-MSC/V-VLR, V-SGSN) comprised in the routing means (STP, V-MSC/VLR, V-SGSN) sends to said module (V-MLR) located in the visited network a message for update location, the message for update location comprising at least a wireless device identifier for the wireless device,
- said module (V-MLR) located in the visited network retrieves from the user data repository (V-UDR) profile data based on the wireless device identifier,
- said module (V-MLR) located in the visited network sends to the end-to-end routing equipment (V-MSC/V-VLR, V-SGSN) the profile data.

5. The method according to claim 3, where the end-to-end routing equipment (V-MSC/V-VLR, V-SGSN) sends to said module (V-MLR) located in the visited network an acknowledgment message for subscribed data insertion (ISD), and where said module (V-MLR) sends to the end-to-end routing equipment (V-MSCN-VLR, V-SGSN) an acknowledgment message for update location.

6. The method according to claim 5, where a phase of attachment authorization check is performed based at least on the profile data and where if the outcome of the attachment authorization check allows the authorization of the attachment, then, after reception of the acknowledgment message for update location at the end-to-end routing equipment (V-MSC/V-VLR, V-SGSN), the end-to-end routing equipment (V-MSC/V-VLR, V-SGSN) allows the attachment of the wireless device to the visited network.

7. The method according to claim 1, comprising the following steps:
- prior to the step of receiving a message from a wireless device at the routing means (STP, V-MSC/V-VLR, V-SGSN), the wireless device is provisioned with a common address for a plurality of core network delivery equipments (V-SMSC, V-GGSN, H-SMSC, H-GGSN) located in different networks, one of the core network delivery equipment (V-SMSC, V-GGSN) being located in the visited network,
- at the routing means (STP, V-MSC/VLR, V-SGSN) located in a visited network, receiving a content message from a wireless device, the content message comprising said common address for the plurality of core network delivery equipments (V-SMSC, V-GGSN, H-SMSC, H-GGSN),
- based on the common address, routing the content message through the routing means (STP, V-MSC/VLR, V-SGSN) of the visited network to the core network delivery equipment (V-SMSC, V-GGSN) located in the visited network.

8. The method according to claim 7, where:
- the routing means comprises an end-to-end routing equipment that is a mobile switching center (V-MSC) of the visited network associated to a visitor location register (V-VLR) of the visited network and where the core network delivery equipment is a short message service center (V-SMSC) of the visited network, or
- the routing means comprises an end-to-end routing equipment that is a Serving GPRS Support Node (V-SGSN) of the visited network and the core network delivery equipment is a Gateway GPRS Support Node (V-GGSN) of the visited network.

9. The method according to claim 7, where the core network delivery equipment (V-SMSC, V-GGSN) located in the visited network is embedded in the module (V-MLR) located in the visited network.

10. The method according to claim 7, where the core network delivery equipment (V-SMSC, V-GGSN) located in the visited network sends for storage the content message to a content data repository (V-CDR) located in the visited network.

11. The method according to claim 10:
- where the content data repository (V-CDR) is accessed by an element located outside the visited network, the element being any one of: a module (H-MLR) located in the home network and comprising at least a home location register (H-HLR) for the home network, a machine to machine application (H-M2MA) located outside the visited network, a machine to machine application gateway (H-M2MAGW) located outside the visited network and enabling communication of a machine to machine application (H-M2MA) located outside the visited network, a machine to machine service platform (H-MSP) located outside the visited network and comprising a machine to machine application and a machine to machine application gateway that interfaces the machine to machine application, another data repository (H-CRD) located outside the visited network and configured to access the data of the content data repository (V-CDR),
- where said element located outside the visited network reads or retrieves the data of the content message stored in the content data repository (V-CDR).

12. The method according to claim 11, where the element located outside the visited network accesses the content data repository (V-CDR) through a private network.

13. The method according to claim 1, where the user data repository (V-UDR) located in the visited network is populated with billing and/or traffic data, where an element located in the home network retrieves the billing and/or traffic data from the user data repository (V-UDR) and provides the data to a billing module or a charging module located outside the visited network for further processing, the element being any one of: a module (H-MLR) located in the home network and comprising at least a home location register (H-HLR) for the home network, a billing or charging application gateway located outside the visited network and interfaces the billing module or the charging module, another data repository (H-CRD) located outside the visited network and configured to access the data of the content data repository (V-CDR).

14. A system for providing a communication service for a wireless device registered in a home network and that is roaming in a visited network comprising routing means (STP, V-MSC/VLR, V-SGSN), the system being characterized in that:
- the routing means (STP, V-MSC/VLR, V-SGSN) of the visited network are configured to be provisioned with a plurality of identifiers that identify a plurality of wireless devices that are registered in the home network, defining thereby a plurality of provisioned wireless device for the visited network;
- the system comprises a module (V-MLR) located in the visited network and comprising at least a home location register (V-HLR),
- the routing means (STP, V-MSC/VLR, V-SGSN) of the visited network are configured to be provisioned with an address of said module (V-MLR), and to access the address of said module (V-MLR) based on any identifier of the plurality of provisioned identifiers;
- the routing means of the visited network comprises at least some routing equipments (STP, V-MSC/VLR, V-SGSN) that are configured to:
  - receive from a wireless device a message comprising at least an identifier
  - determine, based on said identifier, whether the message is received from a provisioned wireless device;
  - perform the following steps if the message is received from a provisioned wireless device: determining, based on said identifier, the address of said module (V-MLR) that is assigned to the provisioned wireless device and then, based on this address, sending to said module (V-MLR) located in the visited network and comprising at least a home location register (V-HLR) at least one of:
    - an authentication request message if the message received from the provisioned wireless device is a request for attachment;
    - an update location message if the message received from the provisioned wireless device is a response to an identity request, the identity request being exchanged during a phase of update location of the wireless device.

* * * * *